(12) United States Patent
Furukawa et al.

(10) Patent No.: US 7,724,922 B2
(45) Date of Patent: May 25, 2010

(54) INTER-STEP PLATE IMAGE INSPECTION FOR PRINTING PREPRESS

(75) Inventors: Itaru Furukawa, Kyoto (JP); Shinichi Maeda, Kyoto (JP); Setsuo Ohara, Kyoto (JP)

(73) Assignee: Dainippon Screen Mfg. Co., Ltd., Kamikyo-Ku (JP)

( * ) Notice: Subject to any disclaimer, the term of this patent is extended or adjusted under 35 U.S.C. 154(b) by 1647 days.

(21) Appl. No.: 10/692,746

(22) Filed: Oct. 27, 2003

(65) Prior Publication Data

US 2004/0086155 A1 May 6, 2004

(30) Foreign Application Priority Data

Oct. 29, 2002 (JP) .............................. 2002-314720
Jun. 20, 2003 (JP) .............................. 2003-175749

(51) Int. Cl.
*G06T 5/00* (2006.01)
*G06K 9/00* (2006.01)
*G06K 9/36* (2006.01)
*G06K 9/40* (2006.01)
*G06K 9/54* (2006.01)
*G03B 27/68* (2006.01)

(52) U.S. Cl. ................... 382/112; 382/167; 382/232; 382/260; 382/304; 358/3.26; 355/52

(58) Field of Classification Search ............... 382/112, 382/167, 232, 260, 304; 358/3.26; 355/52
See application file for complete search history.

(56) References Cited

U.S. PATENT DOCUMENTS

| 5,418,894 | A | * | 5/1995 | Kitamura et al. | ............ 345/601 |
| 5,473,748 | A | * | 12/1995 | Date et al. | ................... 345/536 |
| 5,969,798 | A | * | 10/1999 | Nakagawa et al. | ............ 355/52 |
| 2003/0026457 | A1 | * | 2/2003 | Nahum | ....................... 382/106 |

FOREIGN PATENT DOCUMENTS

| JP | 07-219202 | 8/1995 |
| JP | 09-6975 | 1/1997 |
| JP | 09-245183 | 9/1997 |
| JP | 10-154234 | 6/1998 |
| JP | 2000-272078 | 10/2000 |

OTHER PUBLICATIONS

Machine translation of Japanese Patent Publication No. 10-154234, Sep. 6, 1998.*

* cited by examiner

*Primary Examiner*—Bhavesh M Mehta
*Assistant Examiner*—Kathleen S Yuan
(74) *Attorney, Agent, or Firm*—McDermott Will & Emery LLP

(57) ABSTRACT

Plate-image-inspection RIP data CD2, CD3 are prepared using the same RIP processing conditions from two print image data prepared in different steps of the prepress process, and inspection results are obtained by comparing these data CD2, CD3. Plate-image-inspection RIP data CD2, CD3 can be prepared in several methods: (1) a method for RIP processing respective non-RIP data using standard RIP processing conditions; (2) a method for respectively converting two RIP data to standard RIP processing conditions; and (3) a method for converting one of two RIP data such that it conforms to the RIP processing conditions of the other.

8 Claims, 24 Drawing Sheets

Fig.4(A) NO DIFFERENCE
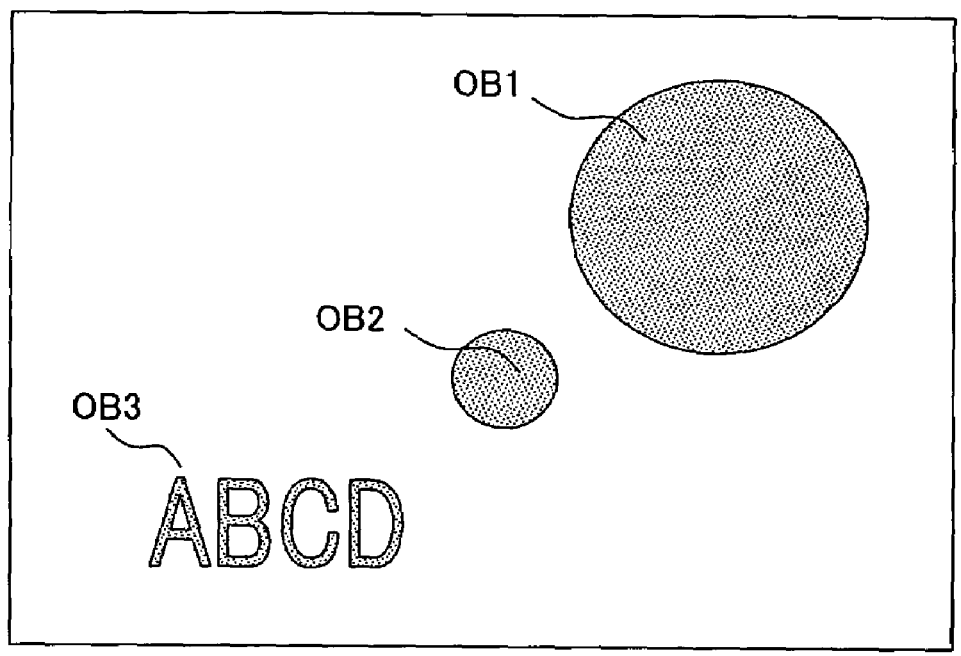
Fig.4(B) DIFFERENCE
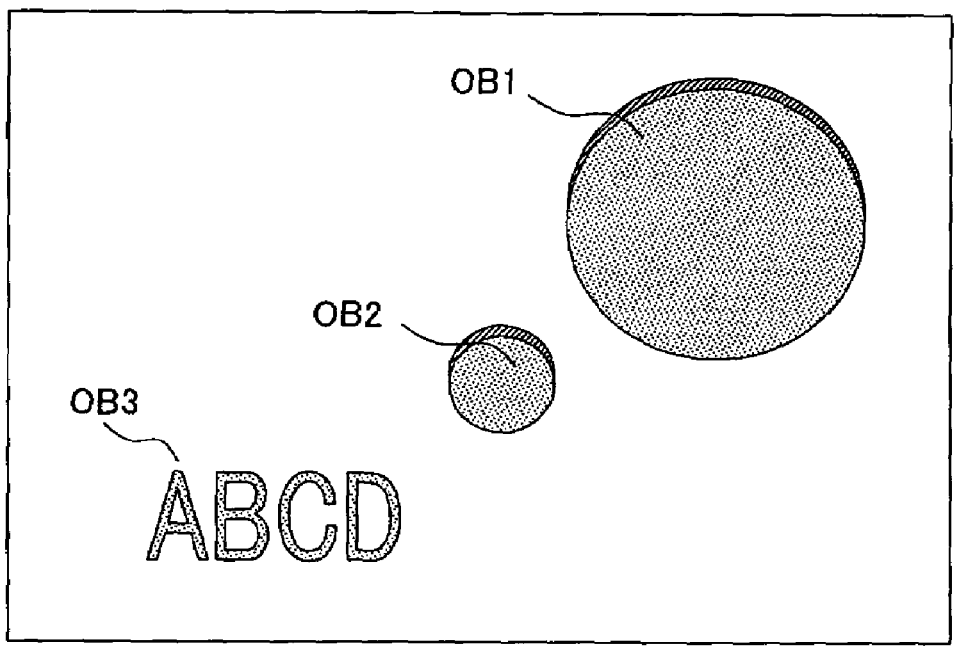

Fig.6(A)  RESOLUTION CONVERSION
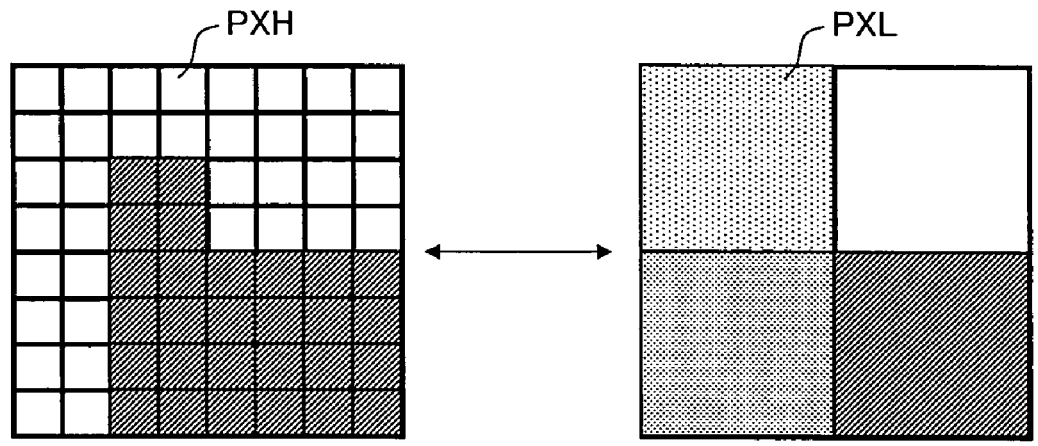
Fig.6(B)  CONVERSION TO HIGH RESOLUTION (SIMPLE PIXEL PADDING)
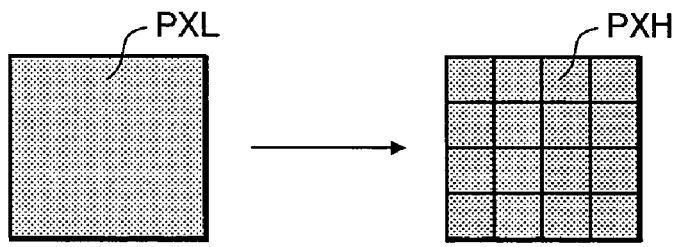
Fig.6(C)  CONVERSION TO HIGH RESOLUTION (SELECTIVE CONVERSION)
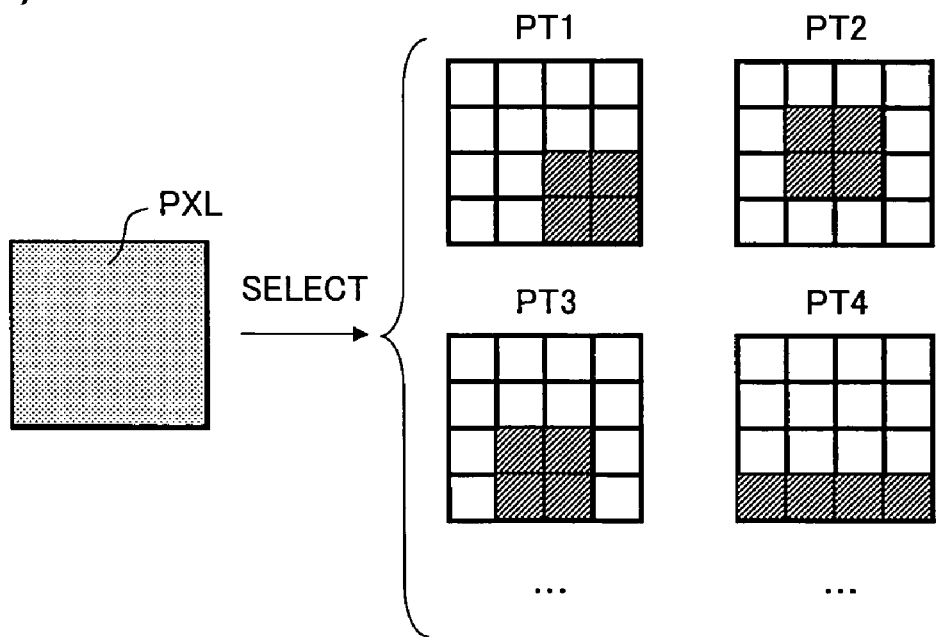

Fig.9
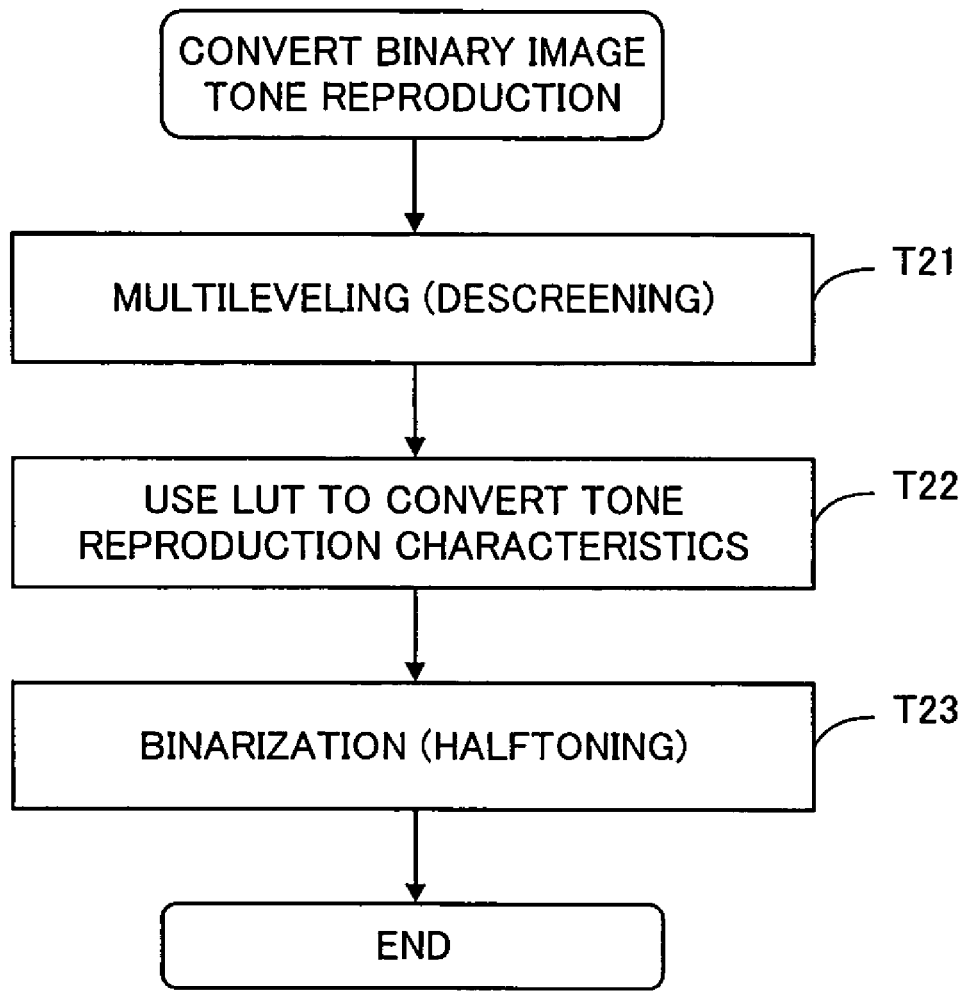
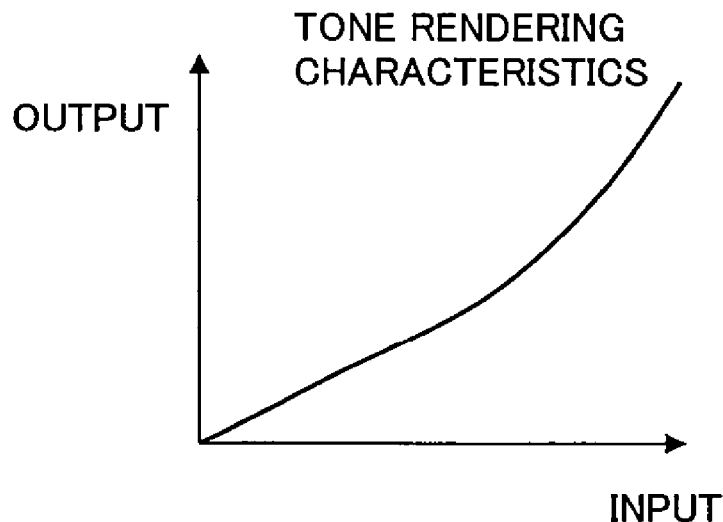

Fig.14

| PAGE ASSIGNMENT SETTING | | | PAGE SIZE A4 ▽ | | | |
|---|---|---|---|---|---|---|
| PRINTING PAGE | | | FILENAME | ORIGINAL PAGES | | |
| START | END | TOTAL | | START | END | TOTAL |
| 001 | 001 | 001 | INTRODUCTION.ps | 001 | 001 | 001 |
| 002 | 015 | 014 | CHAPTER1.ps | 001 | 014 | 014 |
| 016 | 024 | 009 | CHAPTER2.pdf | 005 | 013 | 009 |
| 025 | 025 | 001 | CONCLUSIONS.ps | 001 | 001 | 001 |
| | TOTAL | 025 | | | | |

CANCEL  OK

BEFORE LAYOUT CHANGE

AFTER LAYOUT CHANGE

OPERATIONAL ERROR IN WHCIH PAGE C WAS SUPPOSED TO BE REPLACED WITH PAGE E, BUT PAGE Z WAS REPLACED INSTEAD

PROOF LAYOUT

FINAL OUTPUT LAYOUT

IMPOSITION PARAMETER SETTING ERROR

INTER-STEP PLATE IMAGE INSPECTION FOR PRINTING PREPRESS

BACKGROUND OF THE INVENTION

1. Field of the Invention

The present invention relates to technology for inspecting a printing image that is sequentially being processed by a plurality of processing steps.

2. Description of the Related Art

In line with the progress of computer technology, computer-based digitization has come into widespread use even in prepress systems for commercial printing. In a digital printing prepress system, print image data (for example, PDF data or PostScript data, PostScript being a trademark of Adobe Systems Incorporated) is received, various data processing is performed on this print image data, binary plate data is prepared, and either a plate or screen film is outputted using this plate data. Furthermore, recently binary print image data is being prepared in printing prepress systems, and on-demand printing, whereby this binary print image data is sent to an on-demand printer and direct printing is executed, is being carried out. In this specification, the overall process for preparing this kind of binary plate data and binary print image data is referred to as "printing prepress."

In the printing prepress process, it is important that a printing image be revised in accordance with client instructions. Thus, special care is taken in carrying out the proofchecking of printed material, and in conducting plate image inspections for checking whether or not proofchecking results are being accurately reflected. In a digital printing prepress system, a plate image inspection is carried out by comparing binary plate data before and after proofchecking.

Recently, the importance of plate image inspection processing in particular is increasing. One reason for this is the desire to reduce the number of times that proofs are outputted in order to reduce printing prepress work volume and costs. For example, when a slight change is added immediately prior to final output (the output of a plate or printed material), since it is not necessary to confirm the contents of the revision with the client, who is the originator of the printing order, the proof is most often omitted. Another reason is because, for example, since a printing image is processed as digital data, and an operator can easily change the print image data, there is the risk of errors occurring as a result of this. Thus, when a relatively insignificant revision is added, failure to check this revision properly runs the risk of the final printed material being no good. Thus, the desire to carry out plate image inspection processing automatically for printed images between different steps has increased.

Also, in conventional plate image inspection processing, since plate data was compared before and after proofchecking, it was impossible to carry out a plate image inspection at the processing stage for outputting a first proof. Accordingly, technology for enabling a plate image inspection to be carried out even at the processing stage for outputting a first proof has been needed for some time now.

SUMMARY OF THE INVENTION

Accordingly, an object of the present invention is to enable an inter-step plate image inspection to be carried out easily.

In order to attain the object, there is provided a first plate image inspection method for inspecting a printing image that is sequentially being processed by a plurality of processing steps. The method comprises the steps of preparing, based on two printing image data prepared in different processing steps, two plate-image-inspection RIP data, which are processed under the same RIP processing conditions; and comparing the two plate-image-inspection RIP data to detect differences in the first and second printing image data.

In this first plate image inspection method, since two plate-image-inspection RIP data, which are processed under the same RIP processing conditions, are prepared based on two printing image data prepared in different processing steps, and a plate image inspection is carried out by comparing these plate-image-inspection RIP data, it is possible to easily carry out a plate image inspection for two printing images obtained in different steps even at the processing stage for outputting a first proof.

A second plate image inspection method according to the present invention comprises the steps of: (a) preparing a first RIP data by RIP processing a first printing image data according to first RIP processing conditions; (b) preparing a second RIP data by RIP processing, in accordance with second RIP processing conditions that differ from the first RIP processing conditions, a second printing image data obtained by carrying out another prepress process relative to the first printing image data; (c) preparing a first and second plate-image-inspection RIP data by RIP processing the first and second printing image data, respectively, in accordance with standard RIP processing conditions set beforehand; and (d) comparing the first and second plate-image-inspection RIP data to detect differences between the first and second printing image data.

In this second plate image inspection method, since a first and second plate-image-inspection RIP data are prepared by processing a first and second printing image data, respectively, according to standard RIP processing conditions, it is possible to obtain two plate-image-inspection RIP data, which are processed using the same standard RIP processing conditions. A plate image inspection for two printing images obtained in different steps can be readily carried out even at the processing stage for outputting a first proof.

A third plate image inspection method according to the present invention comprises the steps of: (a) preparing a first RIP data by RIP processing a first printing image data according to first RIP processing conditions; (b) preparing a second RIP data by RIP processing, in accordance with second RIP processing conditions that differ from the first RIP processing conditions, a second printing image data obtained by carrying out another prepress process relative to the first printing image data; (c) preparing a first plate-image-inspection RIP data in accordance with the standard RIP processing conditions, by converting the first RIP data based on a first profile representing the relationship between standard RIP processing conditions set beforehand and the first RIP processing conditions; (d) preparing a second plate-image-inspection RIP data according to the standard RIP processing conditions, by converting the second RIP data based on a second profile representing the relationship between the standard RIP processing conditions and the second RIP processing conditions; and (e) comparing the first and second plate-image-inspection RIP data to detect differences between the first and second printing image data.

In this third plate image inspection method, since a first and second RIP data are respectively converted to accord with standard RIP processing conditions, it is possible to obtain two plate-image-inspection RIP data, which are processed using the same standard RIP processing conditions. Consequently, a plate image inspection for two printing images obtained in different steps can be readily carried out even at the processing stage for outputting a first proof.

A fourth plate image inspection method according to the present invention comprises the steps of: (a) preparing a first RIP data by RIP processing a first printing image data according to first RIP processing conditions; (b) preparing a second RIP data by RIP processing, in accordance with second RIP processing conditions that differ from the first RIP processing conditions, a second printing image data obtained by carrying out another prepress process relative to the first printing image data; (c) preparing a first and second plate-image-inspection RIP data in accordance with the same RIP processing conditions, by converting at the least one of the first and second RIP data based on a profile for expressing the relationship between the first and second RIP processing conditions; and (d) comparing the first and second plate-image-inspection RIP data to detect differences between the first and second printing image data.

In this fourth plate image inspection method, since one of a first and second RIP data is converted to meet the RIP processing conditions of the other, it is possible to obtain two plate-image-inspection RIP data, which are processed under the same RIP processing conditions. Consequently, a plate image inspection for two printing images obtained in different steps can be readily carried out even at the processing stage for outputting a first proof.

The present invention can be realized by various forms, and, for example, can be realized by forms, such as a plate image inspection system or prepress system; a plate image inspection method for these systems; a computer program for achieving the functionality of each portion of these systems (devices) or the functions of each step of a method; a recording medium for recording this computer program; and data signals embedded in a carrier wave containing the computer program.

These and other objects, features, aspects, and advantages of the present invention will become more apparent from the following detailed description of the preferred embodiments with the accompanying drawings.

BRIEF DESCRIPTION OF THE DRAWINGS

FIGS. 4(A) and 4(B) show examples of plate-image-inspection results displayed on display device 400 based on plate-image-inspection results data.

FIGS. 6(A)-6(C) show a resolution conversion method.

FIG. 9 is a flowchart showing a conversion procedure for the tone reproduction characteristics of a binary image.

FIG. 14 shows a screen for page assignment settings.

DESCRIPTION OF THE PREFERRED EMBODIMENT

Preferred embodiments of the present invention will be explained in the following order.
A. Overall Constitution of the System
B. First Embodiment
C. Second Embodiment
D. Third Embodiment
E. Fourth Embodiment
F. Fifth Embodiment
G. Sixth Embodiment
H. Modified Example

A. Overall Constitution of the System

Figure 1:
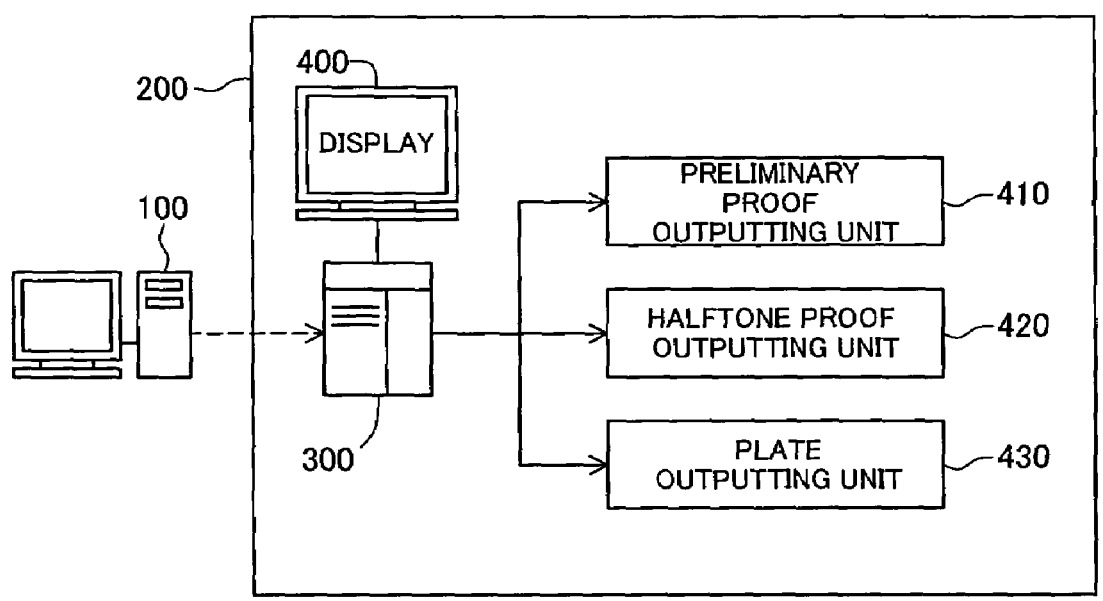
FIG. 1 shows the overall constitution of a prepress system.

FIG. 1 shows the overall constitution of a printing prepress system, which is a first embodiment of the present invention. This printing prepress system comprises a design device 100 for designing printed material and preparing print image data; and a workflow system 200 for preparing either a plate or printed material based on this print image data. The workflow system 200 is constituted by connecting a workflow control system 300 and three outputting units 410, 420, 430 via a network. That is, the preliminary proof outputting unit 410 prints a proof in accordance with print image data. The halftone proof outputting unit 420 outputs a print proof, which has undergone halftone processing (halftoning). The plate image outputting unit 430 fabricates a plate directly from the print image data. The plate image outputting unit 430 is also called a CTP (Computer-to-Plate) system. A display device 400, such as a CRT display or LCD display, is connected to the workflow control system 300, and is capable of displaying a printing image corresponding to print image data, and the results of a plate image inspection.

Figure 2:
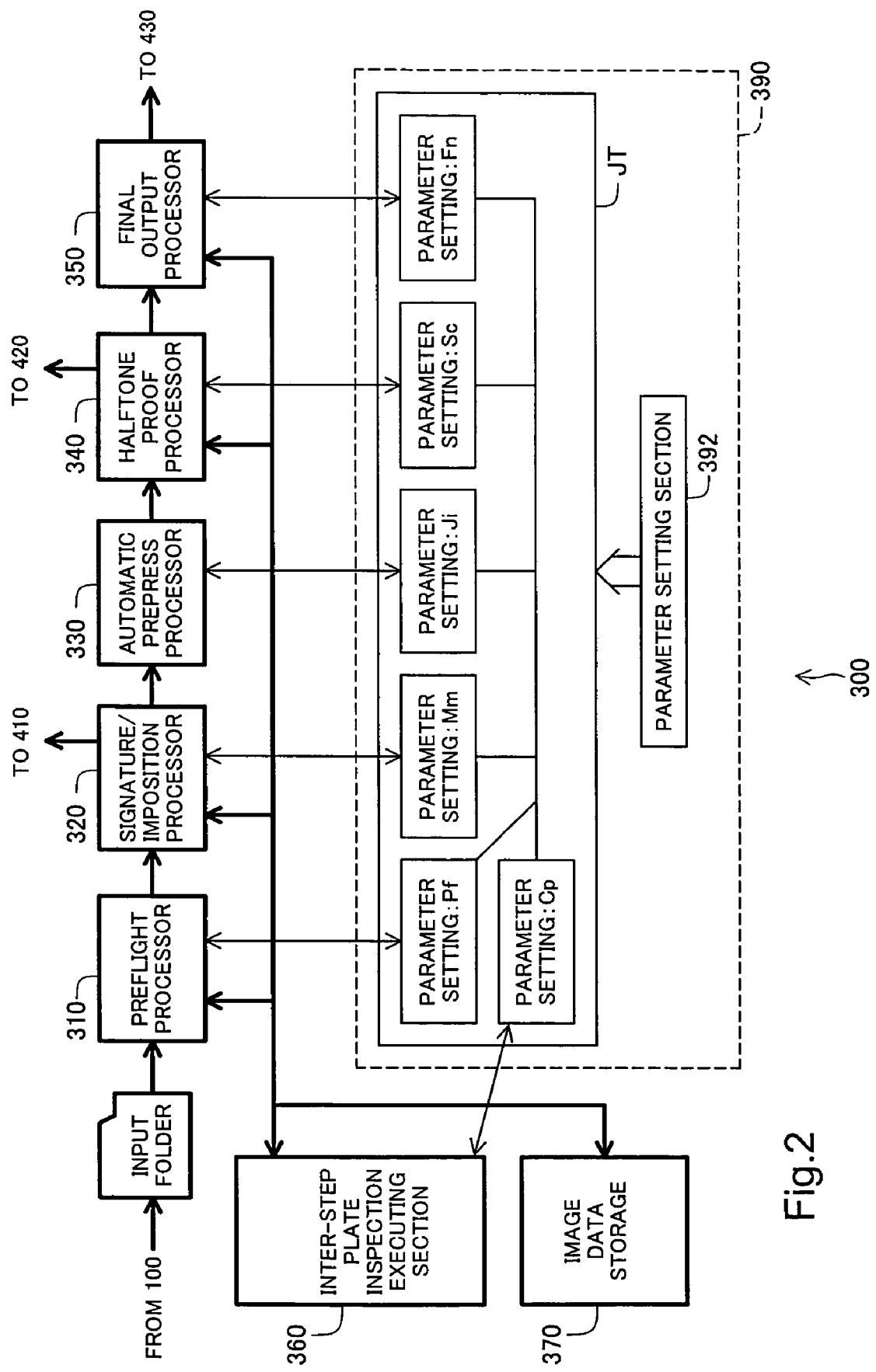
FIG. 2 is a block diagram showing the functional constitution of the plate preparation control system.

FIG. 2 is a block diagram showing the functional constitution of the workflow control system 300. The workflow control system 300 has the following processor functions for processing original print image data of a specific format (PDF data or PostScript data) received from the design device 100.

(1) Preflight Processor 310:

Preflight processing, or so-called pre-processing, is processing for analyzing the contents of original print image data, and checking whether or not the processing for prepress can be executed without a problem. For example, from the description of a PDF file or PostScript file, checks are made to determine (i) the existence of a linked object file inside the text; and (ii) the existence of non-standard font data embedded inside the text, and the like. When there is insufficient data or a file exists, the user is requested to add data or change specifications. Also, the original print image data is RIP processed at display resolution (for example, 72 dpi) by the preflight processor 310, and a printing image is displayed on the display device 400 (FIG. 1) in accordance with the processed processing data (also called "preview RIP data"). The user can use the printing image displayed on the display device 400 to determine whether or not the print image data is appropriate.

(2) Signature/Imposition Processor 320:

Signature processing and imposition processing (processing for arranging a plurality of pages on a single plate) are carried out. Further, this processor also has functions for processing processed data into RIP data for a preliminary proof, and outputting a proof corresponding to this data to the preliminary proof outputting unit 410 (FIG. 1). The user can carry out proofchecking by inspecting the outputted proof. When a plurality of types of output of different sizes is outputted, signature processing and imposition processing are carried out in accordance with each size. For example, when the size of the preliminary proof output differs from that of the plate output, signature processing and imposition processing are carried out for each output.

(3) Automatic Prepress Processor 330:

Inking, setting white borders, trapping and other such processing is performed.

(4) Halftone Proof Processor 340:

RIP processing (Raster Image Processing) and halftone dot processing (halftoning) are carried out, and raster data (also called "RIP data for a halftone proof") representing the plates for the respective ink colors (for example, the four colors of YMCK) is prepared according to output resolution (for example, 4000 dpi). A proof corresponding to halftone proof RIP data is outputted via the halftone proof outputting unit 420 (FIG. 1). The user can carry out proofchecking by inspecting the outputted proof.

(5) Final Output Processor 350:

Output data appropriate for the plate image outputting unit 430 (also called RIP data for final output) is prepared by executing RIP processing on final print image data. The prepared output data is transferred to the plate image outputting unit 430, and the plate image outputting unit 430 fabricates a plate corresponding to the output data.

(6) Inter-step Plate Image Inspection Executing Section 360:

Plate image inspection is carried out using RIP data prepared in different steps. Details of plate image inspection processing will be explained later.

(7) Image Data Storage Section 370:

RIP data for plate image inspection (also called "plate image inspection data") is stored as necessary.

The workflow control system 300 further comprises a controller 390 for controlling the operations of each of these processors 310 through 370. Controller 390 comprises a parameter setting section 392, and a user can set the control parameters of each of the processors 310 though 370 by way of the parameter setting section 392. Various control parameters for one prepress operation (called a "job") are put together in a data file called a job ticket JT. That is, when the processors 310 though 370 execute a single job, the processing content of each processor is controlled in accordance with the control parameters in the job ticket JT.

Furthermore, the functions of the processors 310 through 370 and controller 390 of the workflow control system 300 are realized by a computer (the workflow control system 300) executing computer programs stored on a hard disk not shown in the figure of the workflow control system 300.

B. First Embodiment

Figure 3:
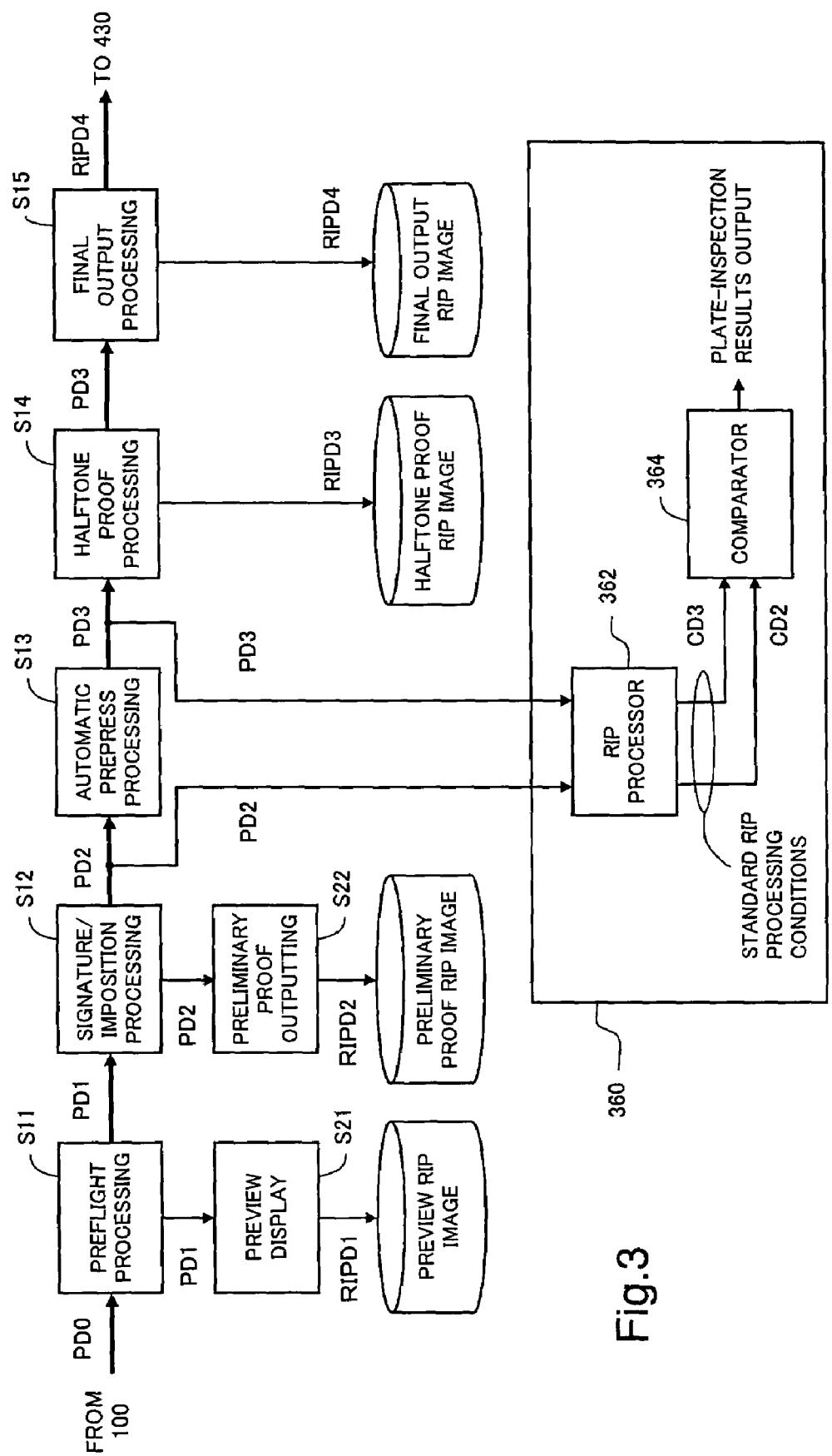
FIG. 3 shows a plate image inspection process of a first embodiment.

FIG. 3 shows a plate image inspection method for a printing prepress process of a first embodiment. In this example, processors 310 through 350 shown in FIG. 2 sequentially execute preflight processing (Step S11), signature/imposition processing (Step S12), automatic prepress processing (Step S13), halftone proof output processing (Step S14) and final output processing (Step S15) for original print image data PD0. In the first three steps S11 through S13, changes are sequentially added to the original print image data PD0, thereby producing processed print image data PD1, PD2, PD3, respectively. These print image data PD0 through PD3 ordinarily are data for which characters (text), graphics (vector graphics) and bit-mapped images, respectively, are expressed as different type objects. As the format for such print image data, it is possible to use page description language format data, such as PostScript, EPS (Encapsulated PostScript) (both are trademarks of Adobe System Incorporated), and PDF. In the halftone proof outputting step S14, halftone proof RIP data RIPD3 is prepared from print image data PD3, and delivered to final outputting step S15 without any changes being added to print image data PD3. In final outputting step S15, final RIP data RIPD4 (either binary plate data or binary print image data) is prepared from this print image data PD3.

The preflight processor 310, subsequent to preflight processing, prepares preview RIP data RIPD1 by executing RIP processing on the preflight processed print image data PD1, and displays a print image based on this data RIPD1 on the display device 400 (Step S21). Further, the signature/imposition processor 320 prepares preliminary proof RIP data RIPD2 by executing RIP processing on signature/imposition processed print image data PD2, and outputs a preliminary proof based on this data RIPD2 (Step S22). As explained hereinabove, in the halftone proof outputting step, halftone proof RIP data RIPD3 is prepared from print image data PD3, and final output RIP data RIPD4 is prepared in the final outputting step (Step S15). These RIP data RIPD1 through RIPD4 are stored in the image data storage section 370 (FIG. 2).

Preview RIP data RIPD1, for example, is multi-level image data expressed via an RGB color system, and is data having an appropriate format for display on display device 400. The other RIP data RIPD2 through RIPD4 also have appropriate formats for the respective image outputting devices. By contrast, the print image data PD1 through PD3 of prior to RIP processing differs from the RIP processed data by the fact that it is data, for which, as explained hereinabove, text, vector graphics and bit-mapped images are expressed as different objects. In this specification, print image data PD0 through PD3 of prior to RIP processing is also referred to as "non-RIP data."

Furthermore, in this specification, "RIP data" or "RIP processed data" denotes raster image data (data sequentially rendered by scanning). Such RIP data can be expressed in various formats. In this embodiment, the RIP data expression format (also called the "RIP processing conditions") is defined by the following parameters P1 through P5.

(P1) Resolution: Resolution denotes the parameter for defining pixel pitch. As resolution values, various resolutions, such as 72 dpi (for display use), 2000 dpi, 4000 dpi and so forth, can be used.

(P2) Number of Tone Levels: This is a value that a pixel value can take per pixel, and is a value determined by the number of bits per pixel. As the number of tone levels, binary (the two tone levels of 0, 1) or multi-level (for example, 256 tone levels of from 0 to 255) can be used.

(P3) Color System: A variety of color systems, such as the RGB color system, YMCK color system, or YCC color system can be used.

(P4) Tone reproduction: This denotes what is called the dot gain characteristics, and various dot gain characteristics can be used.

(P5) Compression Method: A desired data compression algorithm and compression ratio can be used. The compression method can also be used as an indicator for expressing image quality.

A variety of RIP data can be obtained by setting these various parameters as RIP processing conditions, and processing non-RIP data in accordance therewith. For example, the following parameters P1 through P5 can be set for the four types of RIP data RIPD1 through RIPD4 shown in FIG. 3, respectively.

Preview RIP data RIPD1:
(P1) Resolution=72 dpi
(P2) Number of Tone levels=8 bits/one color/one pixel
(P3) Color System=RGB
(P4) Tone reproduction: No dot gain
(P5) Compression Method: No compression Preliminary proof RIP Data RIPD2
(P1) Resolution=600 dpi
(P2) Number of Tone levels=8 bits/one color/one pixel
(P3) Color System=YMCK
(P4) Tone reproduction: No dot gain
(P5) Compression Method: JPEG Halftone Proof RIP Data RIPD3
(P1) Resolution=2400 dpi
(P2) Number of Tone levels=One bit/one color/one pixel
(P3) Color System=YMCK
(P4) Tone reproduction: Halftone proof dot gain characteristics
(P5) Compression Method: One-bit TIFF Final output RIP data RIPD4
(P1) Resolution=4000 dpi
(P2) Number of Tone levels=One bit/one color/one pixel
(P3) Color System=YMCK
(P4) Tone reproduction: Final output dot gain characteristics
(P5) Compression Method: One-bit TIFF The inter-step plate image inspection executing section 360 of the first embodiment comprises a RIP processor 362 and a comparator 364, and is capable of executing plate image inspection using non-RIP data prepared in different steps. In the example of FIG. 3, the RIP processor 362 produces respective plate-image-inspection RIP data CD2, CD3 by executing RIP processing on the non-RIP data PD2 subsequent to the signature/imposition step, and on the non-RIP data PD3 subsequent to the automatic prepress processing step, according to the same standard RIP processing conditions.

Arbitrary conditions can be set beforehand as the standard RIP processing conditions. For example, the standard RIP processing conditions can either be set to conditions that are the same as any one of the RIP processing conditions (the four types of RIP processing conditions described hereinabove) used in processing steps other than plate image inspection, or can be set to other desired conditions. However, since inter-step plate image inspection is carried out primarily when the initial prepress steps (Steps S11 through S15 of FIG. 3) are executed (in other words, at first proof), if the standard RIP processing conditions use a resolution that is lower than the resolution in the final plate image outputting step, it will be sufficient from the standpoint of plate image inspection accuracy, and will also be advantageous in that plate image inspection will be completed in a short time.

The comparator 364 prepares and outputs plate-image-inspection result data by comparing these plate-image-inspection RIP data CD2, CD3. More specifically, for example, the comparator 364 determines a difference of the pixel values of the two plate-image-inspection RIP data CD2, CD3 for each pixel, and prepares image data constituting the pixel value differences as plate-image-inspection results data. The plate-image-inspection results data can either be displayed on the display device 400, or it can be printed out.

FIGS. 4(A) and 4(B) show examples of plate-image-inspection results displayed on display device 400 based on plate-image-inspection result data. FIG. 4(A) shows a case in which there is no difference in the two plate-image-inspection RIP data. This image comprises two circular objects OB1, OB2, and a character (text) object OB3. When there is no difference in the two plate-image-inspection RIP data, the objects OB1, OB2, OB3 are each displayed using a light, unobtrusive color. FIG. 4(B) shows a case in which there is a difference in the two plate-image-inspection RIP data. That is, there is a big difference in the two plate-image-inspection RIP data for the upper portions of the two circular objects OB1, OB2, and these portions are displayed using a loud color that stands out. As a result of this, it is possible for a plate inspector to determine whether or not the print to be made is satisfactory by observing these plate-image-inspection results.

Furthermore, generally speaking, for plate-image-inspection results, it is desirable that pixels for which the difference of pixel values of the two plate-image-inspection RIP data exceeds a prescribed threshold value be displayed using a conspicuous display mode, and that pixels for which the difference of pixel values is less than the threshold value be displayed using an inconspicuous display mode. The presence of color and dots can be used as such a display mode difference. An arbitrary value can be employed as the threshold value. For example, one embodiment can be constituted such that, if the difference of the pixel values is not 0, a conspicuous display is carried out as an indication that there is a difference.

As explained hereinabove, in the first embodiment, since plate-image-inspection RIP data CD2, CD3 is prepared by using common RIP processing conditions to execute RIP processing on non-RIP data PD2, PD3 obtained via different steps, and plate image inspection is carried out by comparing these data, it is possible to carry out plate image inspection for print image data PD2, PD3 of different steps. An advantage such as this is especially notable when initially executing prepress steps S11 through S15 shown in FIG. 3. That is, since halftone proof RIP data RIPD3 is first prepared when these prepress steps S11 through S15 are initially executed, even if an attempt is made to carry out a plate image inspection for this RIP data RIPD3, normally plate image inspection is not possible because the halftone proof RIP data does not exist prior to the proofchecking thereof. By contrast, the first embodiment is advantageous in that, since non-RIP data PD2, PD3 obtained via different steps is RIP processed using common RIP processing conditions, plate image inspection can be executed even when prepress steps S11 through S15 are initially executed.

C. Second Embodiment

Figure 5:
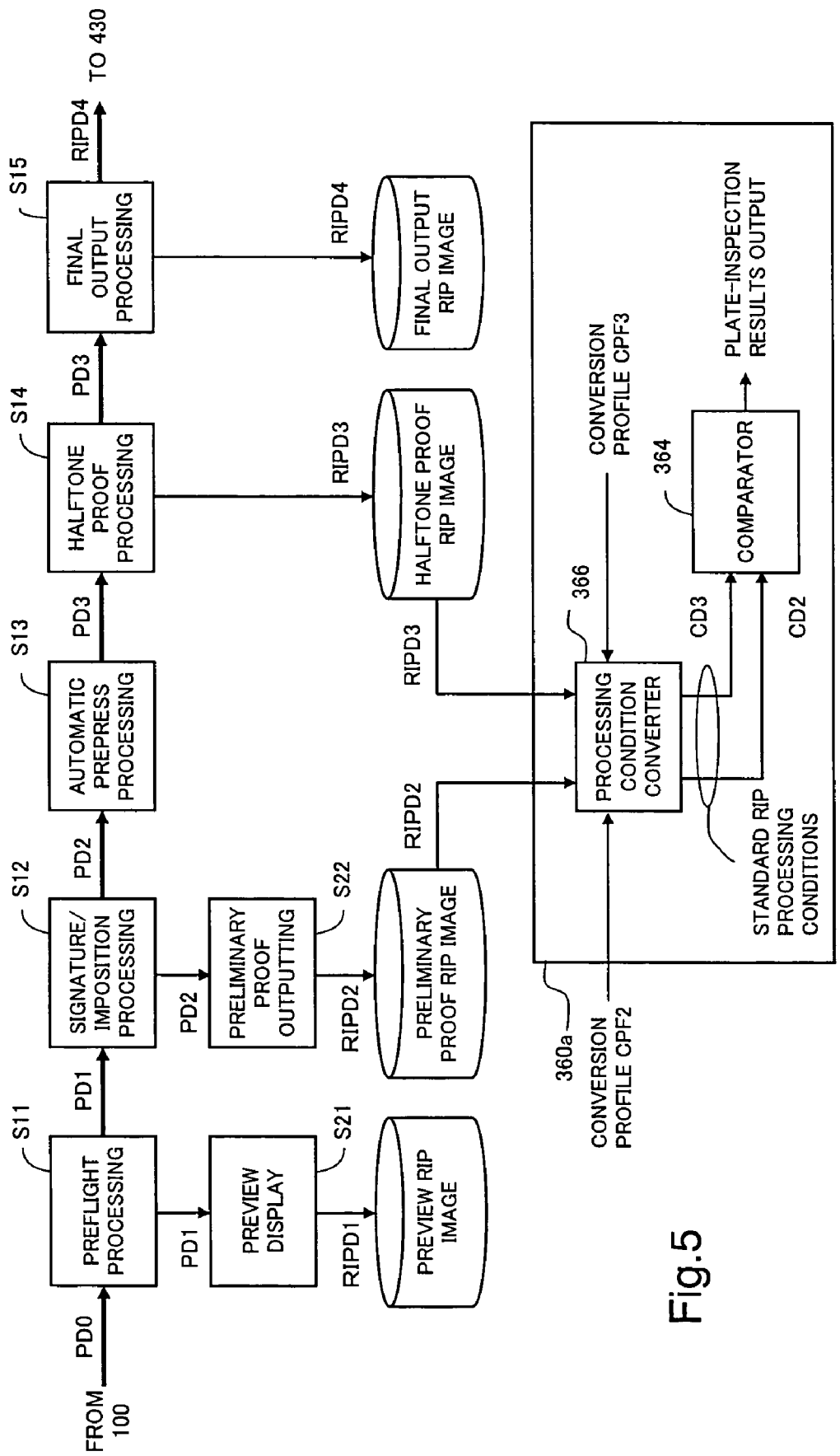
FIG. 5 shows a plate image inspection process of a second embodiment.

FIG. 5 shows a plate image inspection method for prepress steps of a second embodiment. The only difference with the first embodiment shown in FIG. 3 is that inspection executing section 360a comprises a processing condition converter 366 instead of a RIP processor 362. The processing condition converter 366 produces plate-image-inspection RIP data CD2, CD3 by converting preliminary proof RIP data RIPD2 and halftone proof RIP data RIPD3 in accordance with predetermined conversion profiles CPF2, CPF3, respectively.

"Conversion profile" as used herein denotes data for defining conversion contents. In other words, a conversion profile comprises the specific values required for the respective conversions of the five parameters (resolution, number of tone levels, color system, tone reproduction, and compression method) of the RIP processing conditions. The conversion method for each parameter will be explained hereinbelow.

FIGS. 6(A)-6(C) show a resolution conversion method. As is well known, resolution conversion is the mutual conversion of high-resolution images and low-resolution images. In this example, a low-resolution pixel PXL corresponds to 4×4 high-resolution pixels PXH. The conversion of an image to low resolution is not shown in the figure, but this can be achieved by taking a simple average or a weighted average of high-resolution pixels PXH. As a method for converting an image to high resolution, for example, simple pixel padding, like that shown in FIG. 6(B), can be used. This simple padding is a method, whereby a single low-resolution pixel PXL is replaced with N×N high-resolution pixels PXH, and the pixel value of the low-resolution pixel PXL and the pixel values of the high-resolution pixels PXH are maintained at the same value. The selective conversion shown in FIG. 6(C) is a method, whereby a plurality of patterns PT1, PT2, PT3, PT4, . . . , which the pixel values of N×N high-resolution pixels can take correspondent to a low-resolution pixel PXL, are prepared beforehand, and one pattern is selected from thereamong. Which pattern is selected can be determined in accordance with the relationship between the pixel value of the low-resolution pixel PXL to be converted and the pixel values of surrounding low-resolution pixels. When the ratio between low resolution and high resolution is not an integer, when converting to high resolution, it is preferable to interpolate the pixel value of the high-resolution pixels. Furthermore, a method for converting to high resolution other than FIGS. 6(B), 6(C) can also be employed. Resolution information (for example, the resolution ratio) indicating the relationship between the resolutions of RIP data RIPD2, RIPD3, and the resolution of the standard RIP processing conditions is included in the conversion profiles CPF2, CPF3 (FIG. 5). Consequently, the processing condition converter 366 can use this resolution information to convert the resolution of RIP data.

Figure 7:
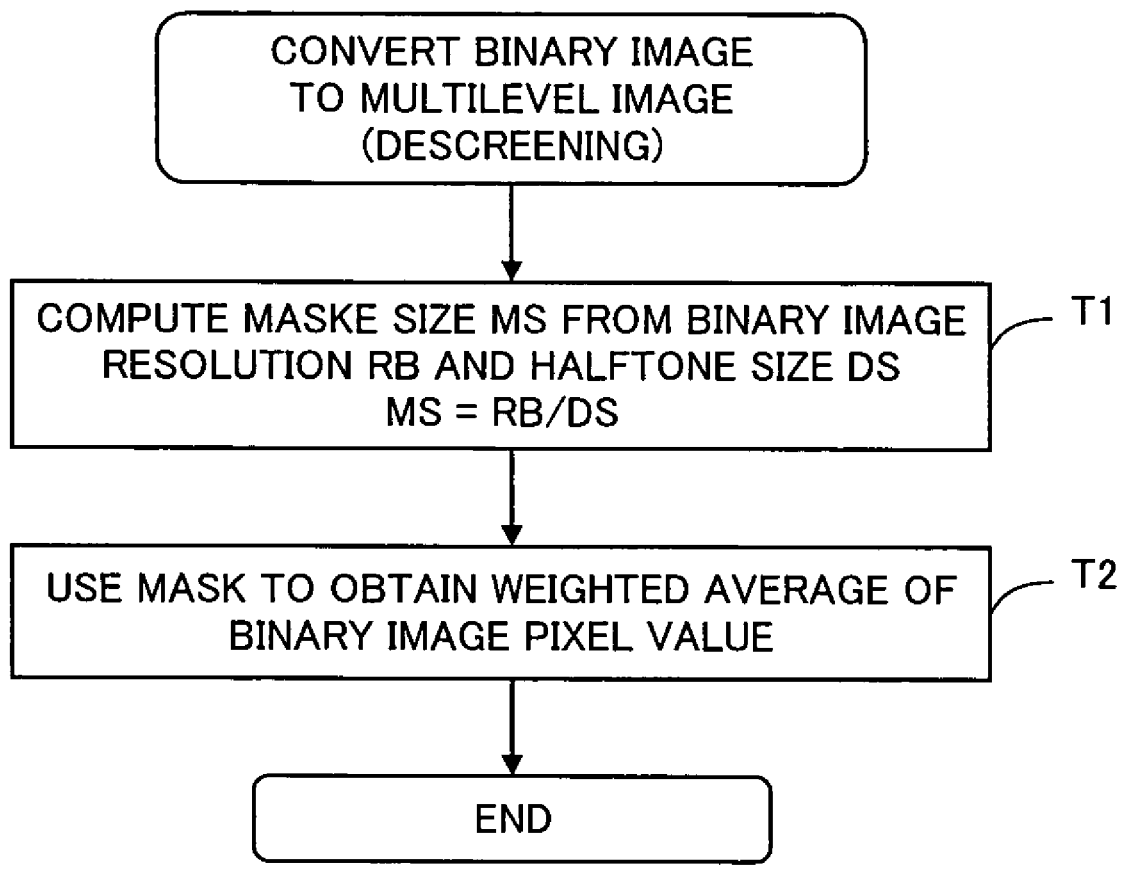
FIG. 7 is a flowchart showing a procedure for making a binary image multilevel.

FIG. 7 is a flowchart showing a procedure for the multilevel processing of a binary image as an example of tone level conversion. The multilevel processing of a binary image is generally referred to as descreening. In descreening, first, a mask size MS=RB/DS is calculated on the basis of binary image resolution RB (dpi) and halftone size DS or screen ruling (lines/inch) in Step T1. For example, when RB=2400 dpi and DS=150 lines/inch, the mask size MS is 16 pixels. Furthermore, the smallest odd number larger than the integer value obtained via RB/DS can also be used as the mask size MS. In Step T2, a mask having this mask size MS as one side is used to determine a weighted average for a binary image pixel value, thereby obtaining the pixel value of a multilevel image in the mask location. This Step T2 is carried out while sequentially moving the mask inside the image region of the binary image one pixel at a time. As a result, it is possible to obtain a multilevel image having the same resolution as the original binary image. For example, when a 16×16 pixel mask is used, an 8-bit multilevel image having between 0 and 255 tone levels is produced. Further, when a 17×17 pixel mask is used, although between 0 and 288 tone levels can be obtained, an 8-bit multilevel image can be obtained by normalizing this to between 0 and 255 tone levels. Furthermore, resolution conversion can also be carried out as needed subsequent to this kind of multileveling.

Converting a multilevel image to binary is a widely known process that is generally referred to as halftoning, and a detailed explanation of this process will be omitted here. Tone level information indicating the relationship between the per-pixel tone levels of RIP data RIPD2, RIPD3, and the tone level of the standard RIP processing conditions is included in the conversion profiles CPF2, CPF3 (FIG. 5).

Figure 8:
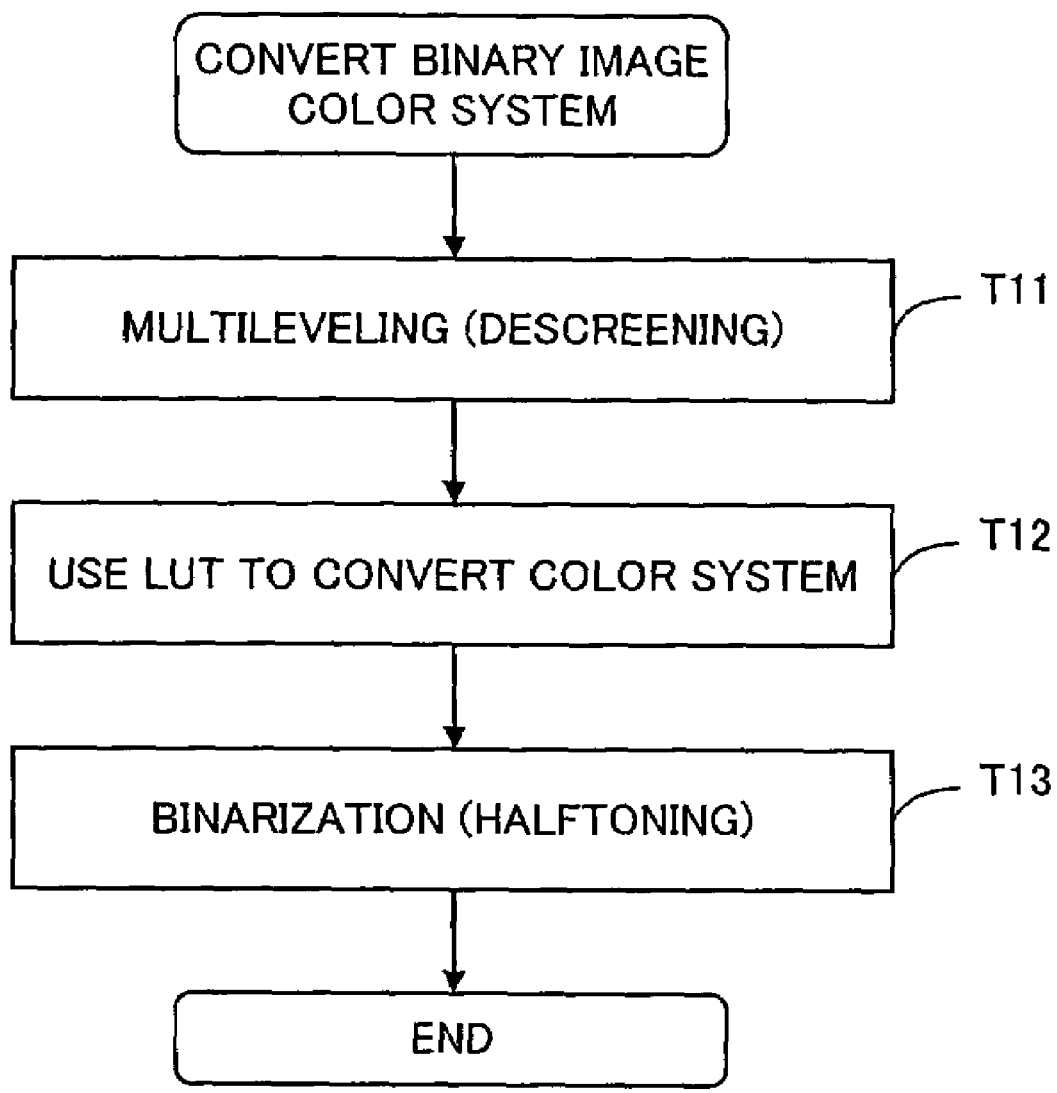
FIG. 8 is a flowchart showing a procedure for the color system conversion of a binary image.

FIG. 8 is a flowchart showing a processing procedure for the color system conversion of a binary image. First, in Step T11, a multilevel image is determined by subjecting a binary image to descreening (FIG. 7). In Step T12, color system conversion is executed for this multilevel image using a look-up table. This look-up table, as is well known, is a table, which, for example, represents conversion from the RGB color system to the YMCK color system, or vice-versa. A color conversion look-up table such as this is included in the conversion profiles CPF2, CPF3 (FIG. 5). In Step T13, binarization or halftoning is carried out for the multilevel image subsequent to converting the color system, thereby creating a binary image rendered in the post-conversion color system. When the original RIP data is a multilevel image, Steps T11, T13 are not necessary.

FIG. 9 is a flowchart showing a conversion procedure for the tone reproduction characteristics of a binary image. In Step T21, a multilevel image is produced by subjecting a binary image to descreening (FIG. 7). In Step T22, the conversion of tone reproduction characteristics is executed on this multilevel image using a look-up table. Tone reproduction characteristics (dot gain characteristics), as shown at the bottom of FIG. 9, are provided in relation to tone level input/output. Therefore, when the tone reproduction characteristics of preliminary proof RIP data RIPD2, for example, differ from the tone reproduction characteristics of the standard RIP processing conditions, a look-up table having input-output characteristics that solve for this difference is included in the conversion profile. In Step T23, binarization or halftoning is carried out for the multilevel image subsequent to converting the tone reproduction characteristics, thereby creating a binary image. When the original RIP data is a multilevel image, Steps T21, T23 are not necessary.

Figure 10:
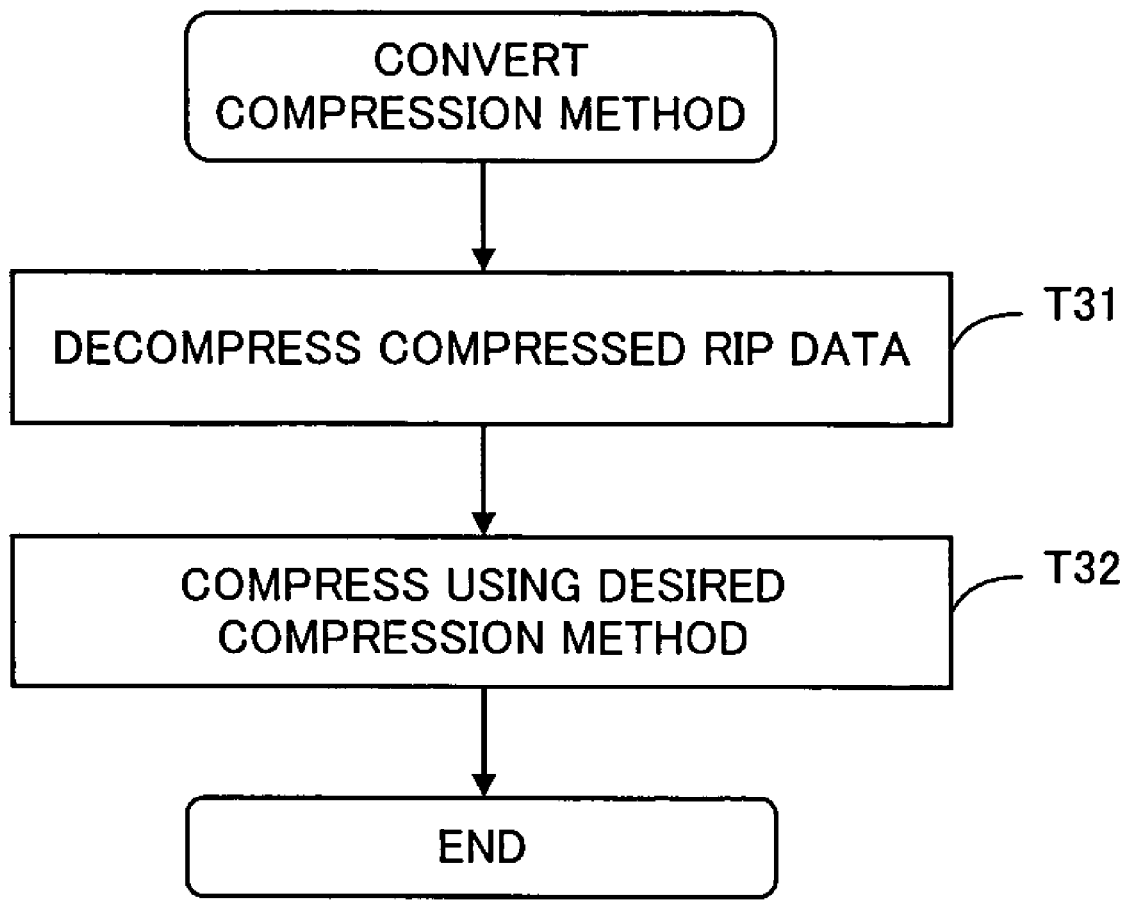
FIG. 10 is a flowchart showing a conversion procedure for a compression method.

FIG. 10 is a flowchart showing a conversion procedure for a compression method. When RIP data is compressed, in Step T31, this RIP data is decompressed. In Step T32, the decompressed RIP data is compressed using the desired compression method (the compression method of the standard RIP processing conditions in the second embodiment). Compression method information indicating the compression methods of the respective RIP data RIPD2, RIPD3 and the compression method of the standard RIP processing conditions are included in the conversion profiles CPF2, CPF3 (FIG. 5).

The processing condition converter 366 (FIG. 5) converts the two RIP data RIPD2, RIPD3, respectively, to the standard RIP processing conditions and prepares plate-image-inspection RIP data CD2, CD3 by using the various processing described hereinabove. Furthermore, conversion is not necessary for those values of the five parameters of the RIP processing conditions applied for the RIP data RIPD2, RIPD3 that are the same as the standard RIP processing conditions. The comparator 364 outputs plate image inspection results like those shown in FIG. 4(A) or 4(B) by comparing the plate-image-inspection RIP data CD2, CD3 thus obtained.

In other words, the processing condition converter 366 has functions for converting two RIP data prepared in different steps to data expressed in accordance with standard RIP processing conditions by carrying out conversion according to the respective pre-determined conversion profiles. However, the processing condition converter 366 does not have to make all of the conditions (parameters) match up with the standard RIP processing conditions, and specific conditions of at the least a section of the RIP processing conditions (for example, the resolution and number of tone levels only) may be converted so as to match up with the standard RIP processing conditions. Furthermore, it is preferable that the standard RIP processing conditions include, as a parameter, a resolution that is lower than the resolution in the final outputting step. The advantage of doing so is that it enables plate image inspections be carried out more quickly and efficiently between prepress steps.

As explained hereinabove, in the second embodiment, since two RIP data are converted so as to match up with standard RIP processing conditions, it is possible to execute plate image inspection using RIP data prepared in two different steps part way through the prepress steps.

D. Third Embodiment

Figure 11:
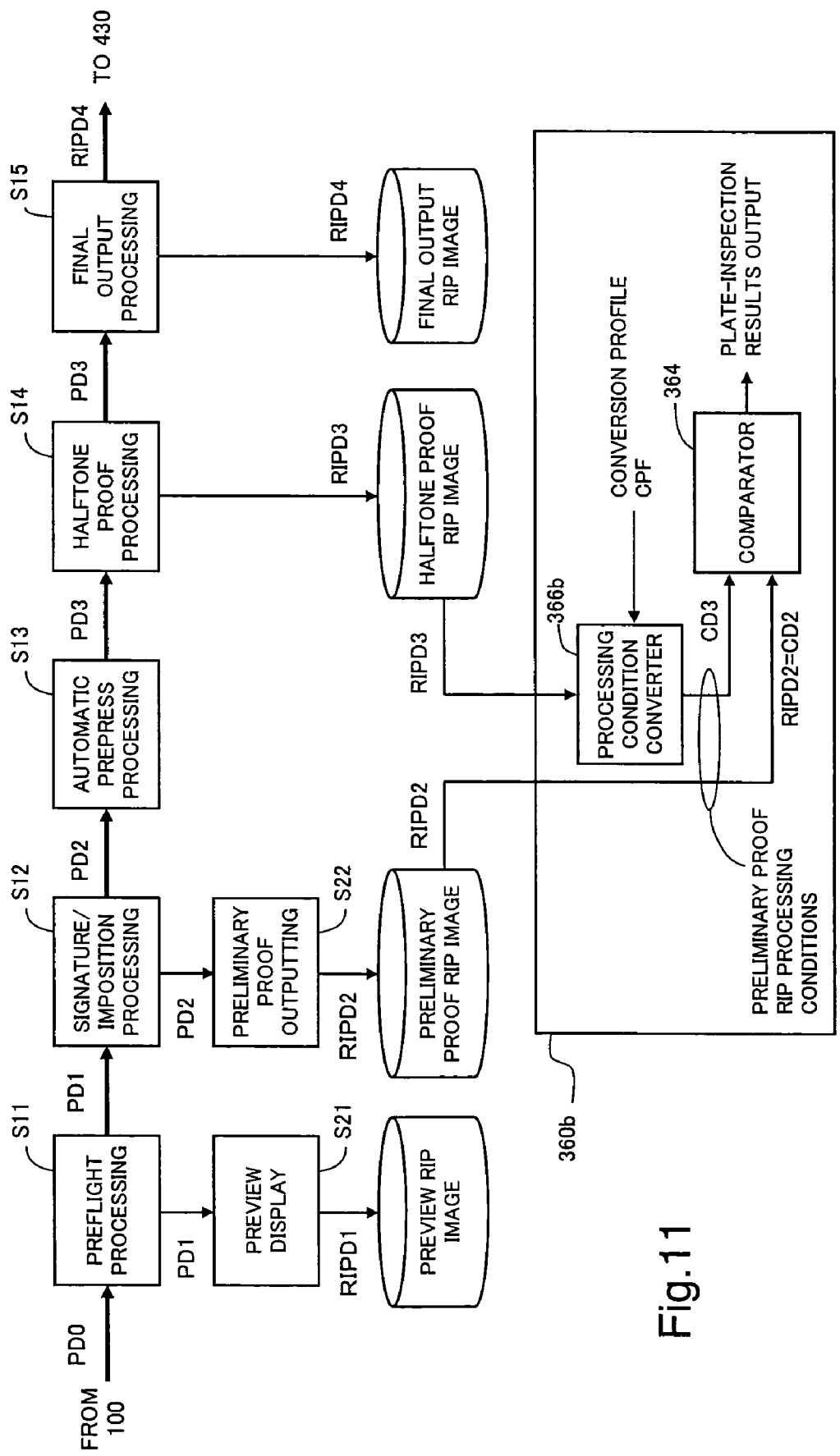
FIG. 11 shows a plate image inspection process of a third embodiment.

FIG. 11 shows a plate image inspection method for prepress steps of a third embodiment. The only difference with the second embodiment shown in FIG. 5 is that the processing condition converter 366b inside the inspection executing section 360b converts only one of the two RIP data. More specifically, in the example of FIG. 11, the processing condition converter 366b converts halftone proof RIP data RIPD3 to conform to preliminary proof RIP processing conditions. Consequently, a profile comprising information indicating the relationship between halftone proof RIP processing conditions and preliminary proof RIP processing conditions is used as the conversion profile CPF. Furthermore, this processing condition converter 366b does not have to make all of the conditions (parameters) of the RIP processing conditions match, and specific conditions of at the least part of the RIP processing conditions (for example, the resolution and number of tone levels only) may be converted so as to match up.

The comparator 364 outputs plate image inspection results by comparing the plate-image-inspection RIP data CD3 obtained via processing condition converter 366b against preliminary proof RIP data RIPD2. As described above, in the third embodiment, since one of the two RIP data is converted so as to match up with the RIP processing conditions of the other RIP data, it is possible to execute plate image inspection using RIP data prepared in two different steps through the prepress steps. Further, since only one of the two RIP data need to be converted, it is advantageous in that the conversion processing load is lighter than in the first embodiment and the second embodiment.

As can be understood from the three embodiments described hereinabove, in the present invention, A prepress system and plate image inspection method may be constituted such that two plate-image-inspection RIP data CD2, CD3 in accordance with the same RIP processing conditions are prepared on the basis of two printing image data prepared in different processing steps among the prepress steps, and plate image inspection results are obtained by comparing these data CD2, CD3.

E. Fourth Embodiment

Figure 12:
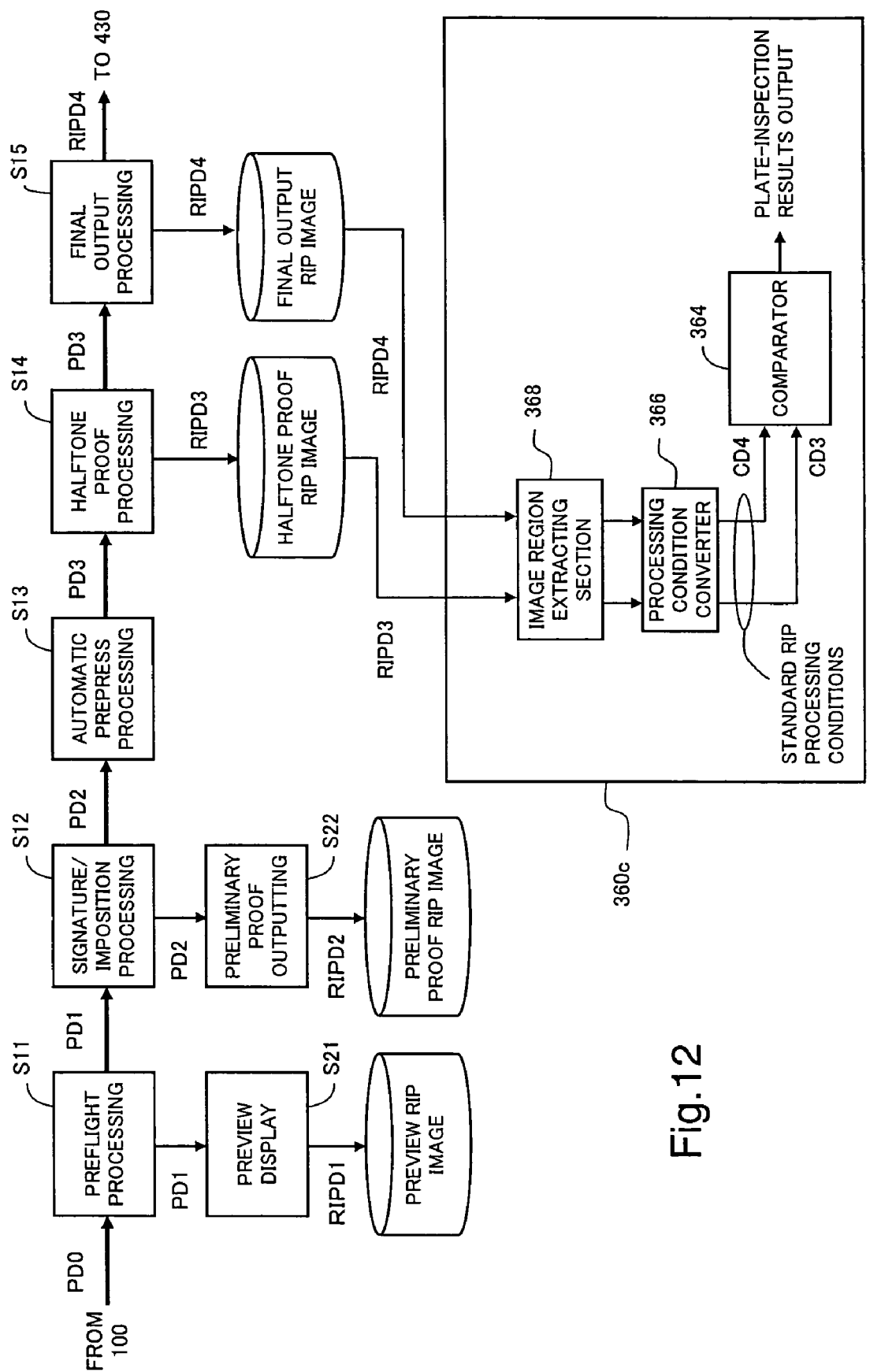
FIG. 12 shows a plate image inspection process of a fourth embodiment.

FIG. 12 shows the prepress steps of a fourth embodiment. The only difference with the second embodiment shown in FIG. 5 is that an image region extracting section 368 is added to the inspection executing section 360c. The image region extracting section 368 extracts a corresponding printing page from two printing image data for which different page layouts were carried out (a detailed explanation will be given later). The processing subsequent thereto is the same as that of the second embodiment. The image region extraction section 368 may also be added to the inspection executing section 360 of the first embodiment (FIG. 3) or the inspection executing section 360b of the third embodiment (FIG. 11).

Figure 13:
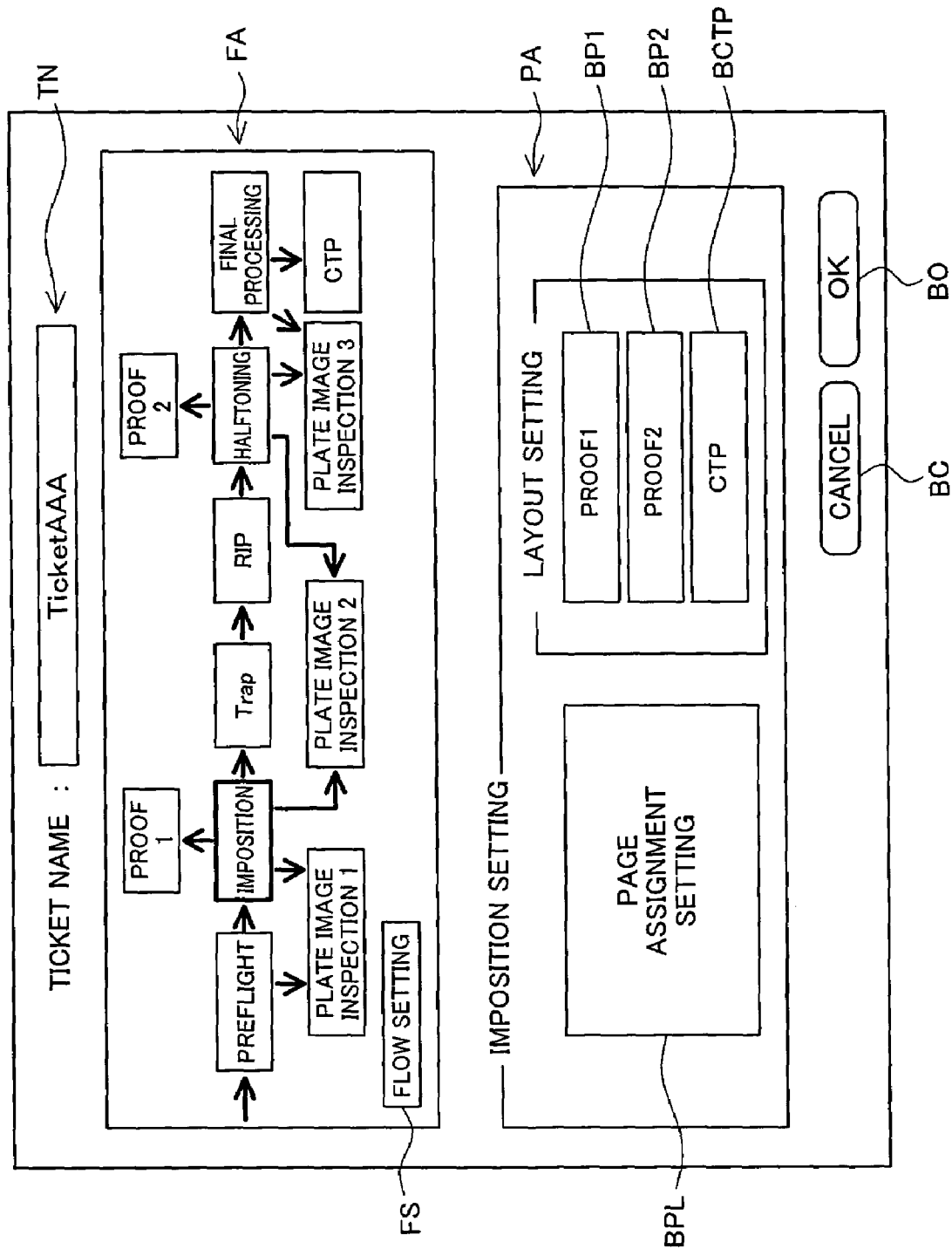
FIG. 13 shows a state, wherein control parameter settings are carried out.

FIG. 13 shows a control parameter setting window on the display device 400 in the fourth embodiment. Using this window, a user can set the flow pattern of a job (printing prepress operation), and can set the control parameters of each processing step. The window has a ticket name setting section TN for inputting the name of a job ticket; a flow pattern setting section FA for setting the flow of the processing steps; a control parameter setting section PA for setting the control parameters of each process within the flow pattern; an okay button BO for confirming content that has been set; and a cancel button BC for canceling content that has been set.

The ticket name setting section TN includes a field for setting a name for identifying a job ticket JT (FIG. 2). The job ticket JT is a data file comprising control parameters for each processing step. Setting a new name enables new job settings to be carried out. When print image data processing is to be carried out again after proofchecking, the processing can be carried out with the same settings by setting the name used the previous time.

The flow pattern setting section FA is used for setting and confirming the flow pattern of the processing to be executed. In the example shown in FIG. 13, a flow pattern corresponding to the flow of processing shown in FIG. 12 is shown. Within the flow pattern, "proof1" corresponds to a preliminary proof outputting step S22 (FIG. 12), and "proof2" corresponds to the output of a halftone proof outputting step. Further, "RIP" and "halftone" represent RIP and halftone processing steps, respectively. In the flow pattern of FIG. 13, three inter-step plate image inspections are set. In the first inter-step plate image inspection, plate image inspection is carried out using RIP data RIPD2 for a preliminary proof, and RIP data RIPD1 for displaying a preview screen. The second inter-step plate image inspection is a step for carrying out an inspection using RIP data RIPD3 for a halftone proof and RIP data RIPD2 for outputting a preliminary proof. The third inter-step plate image inspection is a step for carrying out an inspection using RIP data RIPD4 for a final output and RIP data RIPD3 for a halftone proof, and is executed prior to carrying out final output. The inspection executing section 360c shown in FIG. 12 shows the situation when the third inter-step plate image inspection of FIG. 13 is executed, but first and second inter-step plate image inspections are also executed by this inspection executing section 360c.

The control parameter setting section PA shown in FIG. 13 is a screen area for setting and confirming the control parameters of each processing step shown in the flow pattern setting section FA. In this fourth embodiment, a user can set the control parameters for a processing step selected in the flow pattern setting section FA (the processing step indicated in bold) via the control parameter setting section PA. In the example of FIG. 13, "imposition" is selected in the flow pattern setting section FA, and four buttons for setting the control parameters of "imposition" (a page assignment setting button BPL, a proof1 layout setting button BP1, a proof2 layout setting button BP2, and a CTP layout setting button BCTP) are displayed inside the control parameter setting section PA. The page assignment setting button BPL is the button for setting the corresponding relationship between the printing image data and the printing page, which will actually be printed. The proof1 layout setting button BP1, proof2 layout setting button BP2 and CTP layout setting button BCTP, respectively, are buttons for setting the printing page layout conditions used when outputting proof1 (preliminary proof), proof2 (halftone proof) and a plate (a detailed explanation will be given later.).

FIG. 14 shows a screen displayed by operating the page assignment setting button BPL in the screen shown in FIG. 13. A user can set the corresponding relationship between a printing image data and a printing page, which will actually be printed, by operating this page. As shown in the figure, a page size setting section MPS for setting the size of one print page; a printing pages table TPP for setting the actual printing pages; a filename table TFN for setting a filename under which printing image data used on each printing page is stored; a used pages table TUP for setting the pages to be used within the printing image data; an okay button BO for confirming content that has been set; and a cancel button BC for canceling content that has been set are displayed in the screen.

The page size setting section MPS includes a menu for setting the size of the page of the printed matter to be made, and in the example of FIG. 14, "A4" size has been selected.

The filename of the original print image data corresponding to the printing pages, and the pages to be used within the original print image data are shown on the same row in the printing pages table TPP, filename table TFN and original pages table TUP. For example, row R1 shown in FIG. 14 indicates that nine pages from page number 16 through 24 of the printing plate image correspond to nine pages from page number 5 through 13 of the original print image data file named "Chapter2.pdf." In this way, even when a plurality of files are used for storing printing image data, appropriate printing prepress can be carried out by performing page assignment.

Figure 15:
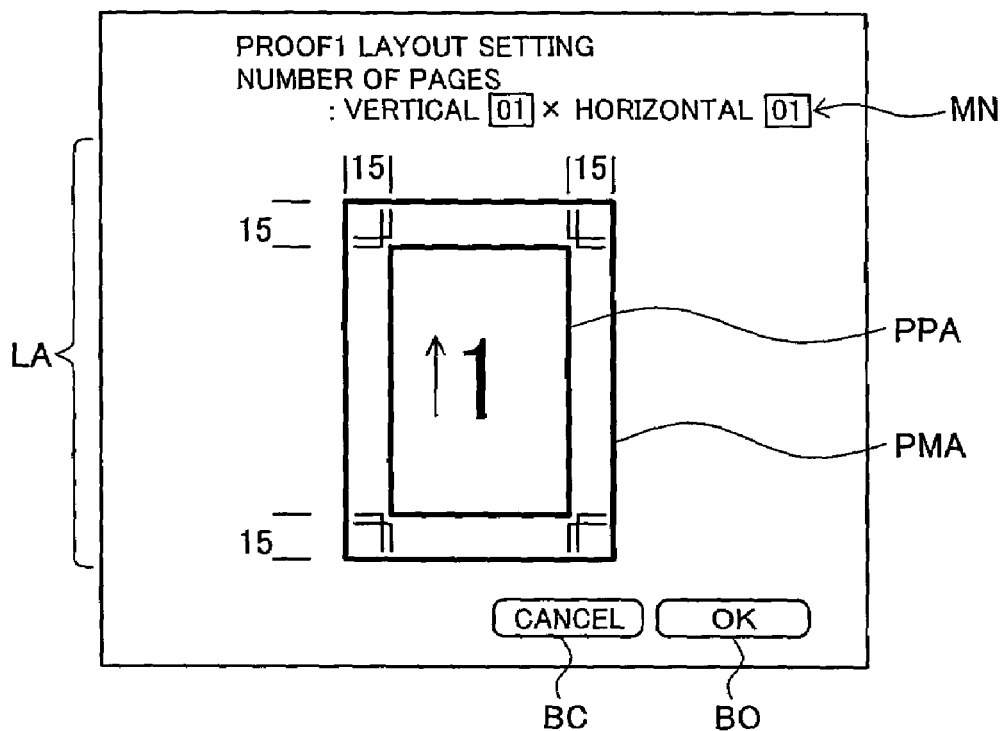
FIG. 15 shows a screen for proof1 layout settings.

FIG. 15 shows a screen displayed by operating the proof1 layout setting button BP1 shown in FIG. 13. Using this screen, a user can set the printing page layout conditions used for a preliminary proof (proof1). As shown in the figure, a number-of-pages setting section MN for setting the number of pages in one page of proof1; a page layout setting section LA for setting the position, orientation, and page number combinations of printing pages in each page of proof1; an okay button BO for confirming the content that has been set; and a cancel button BC for canceling the content that has been set are displayed in the screen.

The number-of-pages setting section MN includes a field for setting the number of printing pages laid out on one page of proof1, and a user can set the number of pages for the vertical direction and the horizontal direction, respectively. In the example of FIG. 15, there is one page each for vertical and horizontal, that is, one printing page has been allocated for one page of proof1.

A printing page area PPA corresponding to the size of one page of printed matter set in the screen of FIG. 14, and a mount area or layout sheet area PMA corresponding to the size of an output page of the output device (in this example, the preliminary proof outputting unit 410 (FIG. 1)), and the position of the printing page area PPA inside the mount area PMA are shown in the page layout setting section LA. By manipulating these positions, a user can set the position of the printing page area PPA in the mount area PMA. When a plurality of output pages are outputted, the set position setting can be used in common. The arrow and numeral shown inside each printing page area PPA represent the orientation of the printing page and the page number, and a user can arbitrarily set the orientation of a printing page inside the mount area PMA, and the page number allocation of the printing pages. In the example of FIG. 15, page number 1 is allocated. One printing page is sequentially allocated for the second and subsequent output pages as well. The page number allocation of printing pages is set with consideration being given to trimming and folding the output prints and other such bookbinding methods, especially when a plurality of printing page areas PPA is allocated within a single mount area PMA. The assignment of a plurality of pages will be explained hereinbelow. Setting the printing page layout conditions like this makes it possible to appropriately set each printing page so that it is arranged in a specific position at a specific orientation on a specific output page. Furthermore, the set printing page layout conditions are stored in a job ticket JT (FIG. 2), and are used when preparing preliminary proof RIP image data RIPD2 in the preliminary proof outputting step S22 (FIG. 12).

Figure 16:
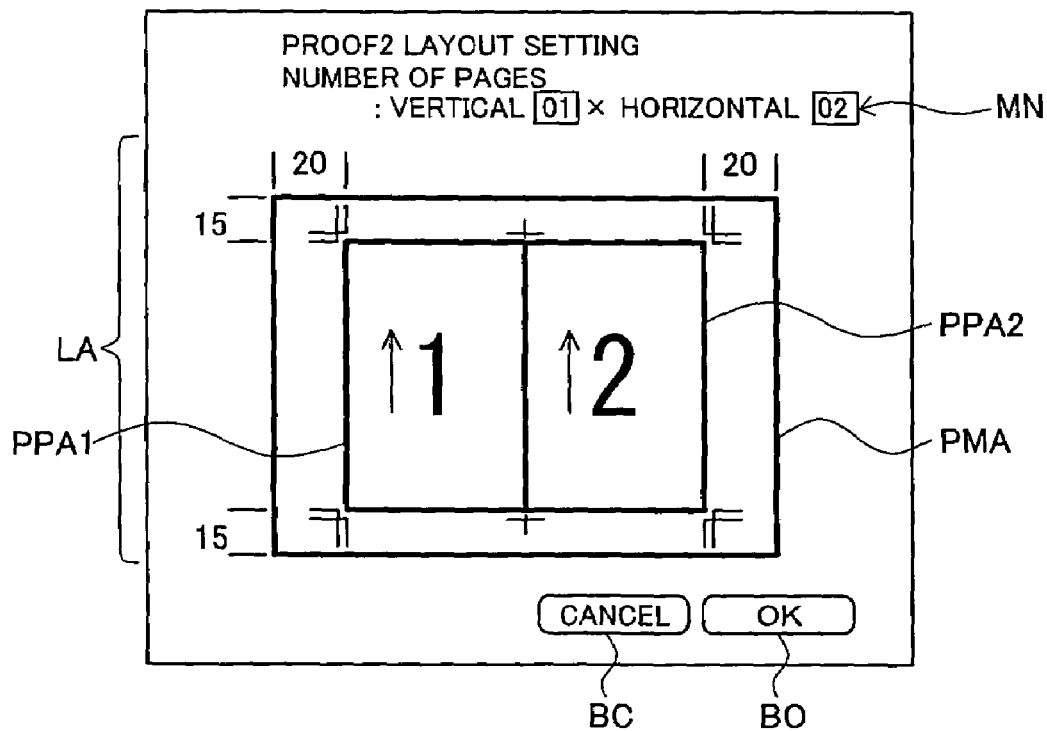
FIG. 16 shows a screen for proof2 layout settings.

FIG. 16 shows a screen displayed by operating the proof2 layout setting button BP2 on the screen shown in FIG. 13. By operating this screen, a user can set the printing page layout conditions used when producing a halftone proof (proof2). The screen configuration and user settable contents are the same as the example shown in FIG. 15. In this example, two printing page areas PPA1 and PPA2 are allocated within a single mount area PMA. As the page number allocation, page 1 is allocated to the printing page area PPA1 positioned on the left, and page 2 is allocated to the printing page area PPA2 positioned on the right. Two printing pages are also allocated on the second and subsequent output pages as well. As a result of this, odd pages are allocated to the left side, and even pages are allocated to the right side.

Figure 17:
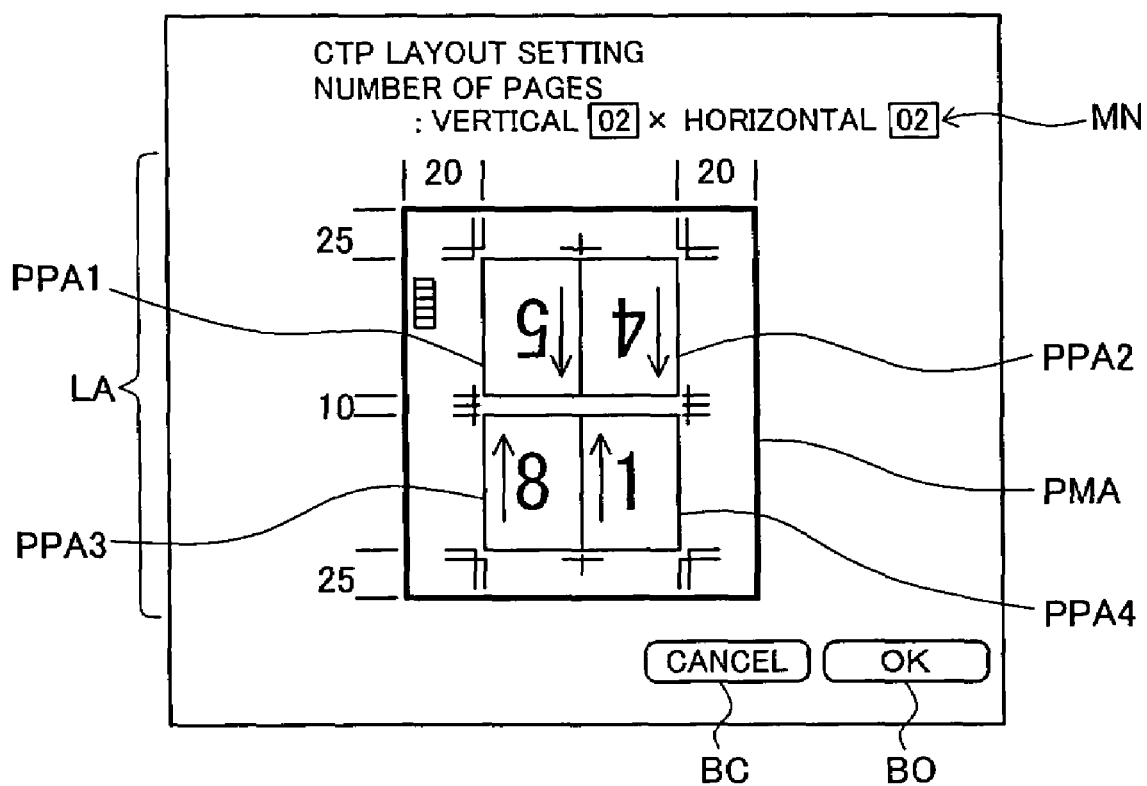
FIG. 17 shows a screen for CTP layout settings.

FIG. 17 shows a screen displayed by operating the CTP layout setting button BCTP on the screen shown in FIG. 13. By operating this screen, a user can set the printing page layout conditions used when outputting a final plate image. The screen configuration and user settable contents are the same as the example shown in FIG. 15. In this example, four printing page areas PPA1 through PPA4 are allocated to a single mount area PMA. For page number allocation and orientation, consideration is given to the final printed matter bookbinding method, and four printing pages, i.e. pages 1, 4, 5, 8, are allocated so as to be arranged in the proper order and orientation when bookbinding is carried out. Similarly, printing pages are also suitably allocated for the second and subsequent output pages keeping the bookbinding method in mind. Furthermore, even if the same number of printing pages (four in this example) are arranged in a single mount area PMA, there will be instances when the printing page number allocation and orientations will differ when page binding differs.

Figure 18:
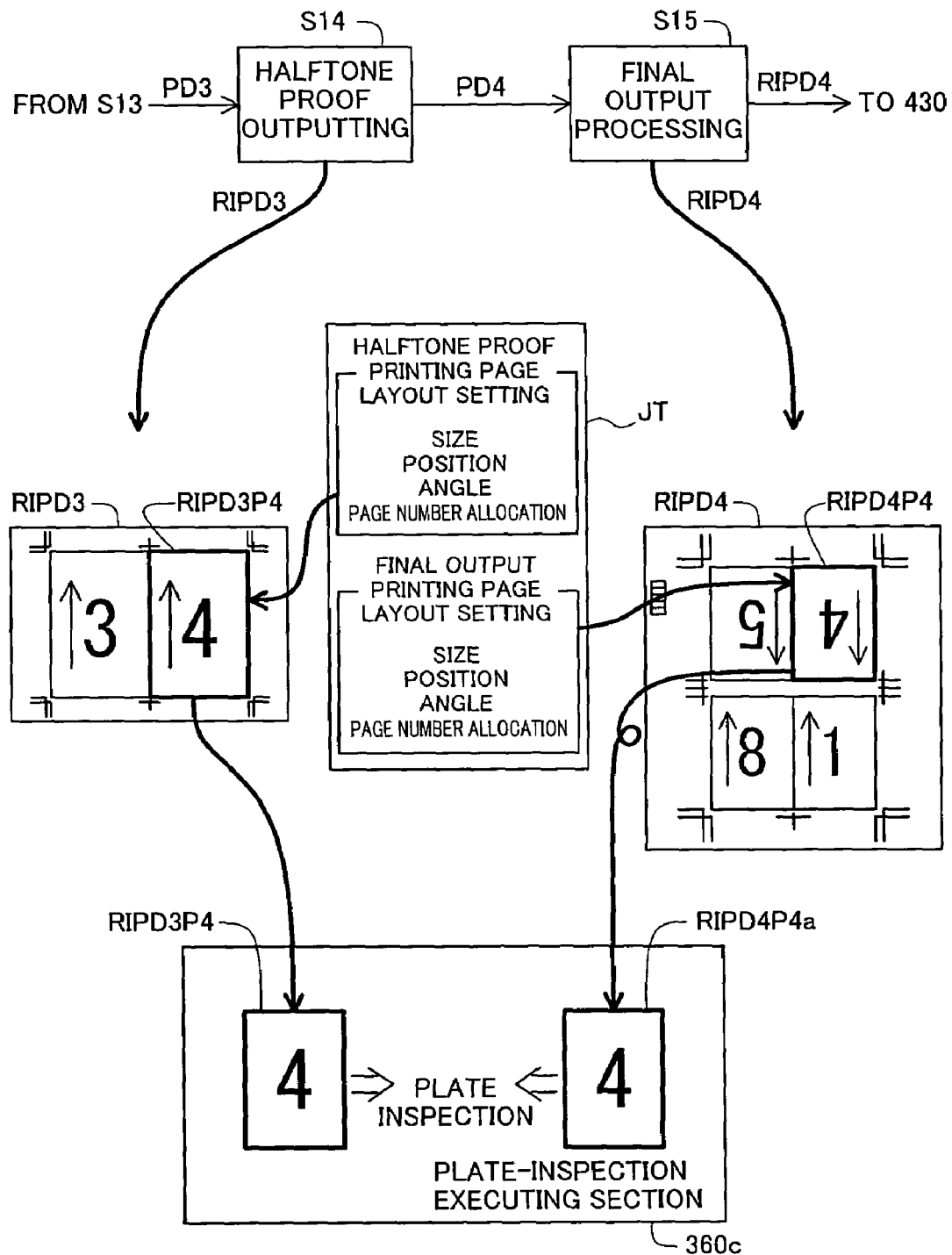
FIG. 18 is a schematic diagram illustrating a plate image inspection using printing page layout conditions.

FIG. 18 is a schematic diagram illustrating a plate image inspection using printing page layout conditions. This example describes a case, in which page 4 of the printing pages is compared and inspected in a plate image inspection process for comparing final mount layout image data (final output RIP image data) RIPD4 against mount layout image data approved at halftone proof proofing (halftone proof RIP image data) RIPD3. In this specification, "mount layout image data" denotes data for expressing an image in which one or more printing pages are laid out on a mount area.

The image region extracting section 368 of the inspection executing section 360c (FIG. 12) first carries out processing for cutting out one page worth of image data from among the mount layout image data using printing page layout conditions stored in a job ticket JT. For example, when comparing page 4 of the printing pages, the effective region of page 4 of the image data RIPD3P4 is cut out from the mount layout image data RIPD3 used in the halftone proof. Similarly, the effective region of page 4 of the image data RIPD4P4 is cut out from among the final output mount layout image data RIPD4. "Effective region" here denotes the region in which an actual page image is to be printed. When the image objects constituting this page protrude from this effective region, only the image parts inside the effective region are extracted by the extracting section 368. In the example of FIG. 18, page 4 has been rotated and arranged within the mount layout image data RIPD4, and therefore the image region extracting section 368 rotates the image data RIPD4P4 of page 4 in accordance with the printing page layout conditions, thereby producing image data RIPD4P4a of page 4 having the same orientation as image data RIPD3P4. Next, the processing condition converter 366 converts the two image data RIPD3P4, RIPD4P4a so as to conform to the standard RIP processing conditions. Then, comparator 364 compares the two image data CD3, CD4 subsequent to the conversion (FIG. 12).

Figure 19:
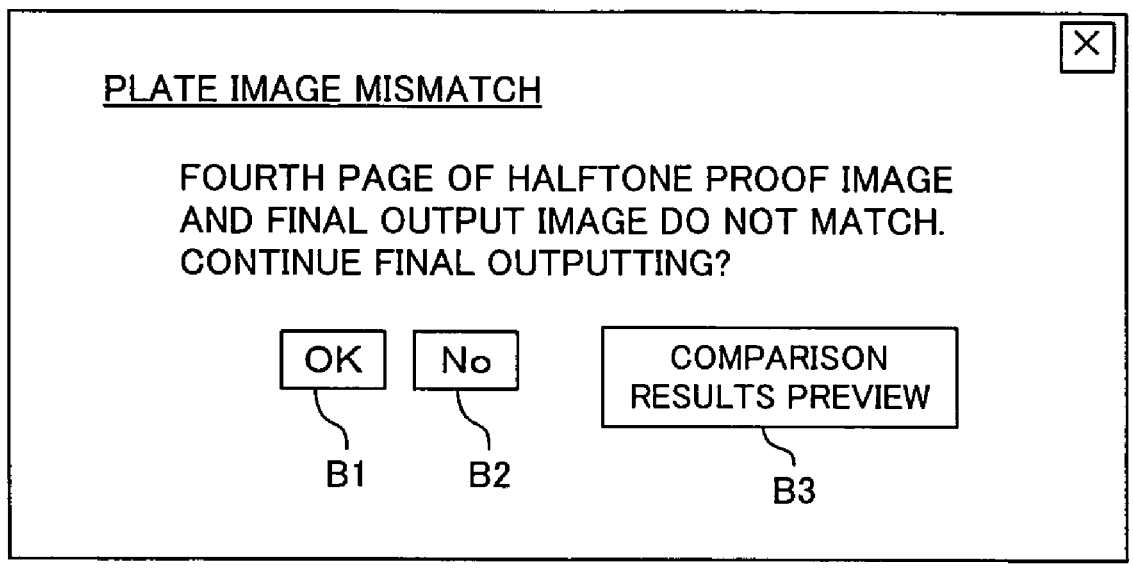
FIG. 19 shows an example of an alert display for plate image inspection results.

FIG. 19 shows an example of an alert display screen for when plate image inspection results contain an image mismatch. Text notifying the user or operator of the fact that a discrepancy exists between the two printing image pages is displayed on this alert display screen or warning display screen. The user can press the "OK" button B1 when he wants processing to continue as is, or he can press the "No" button B2 when he wants to cancel or stop processing. Further, if he presses the comparison results preview button B3, an inspection results screen clearly showing the comparison results for the two images is displayed.

Figure 20:
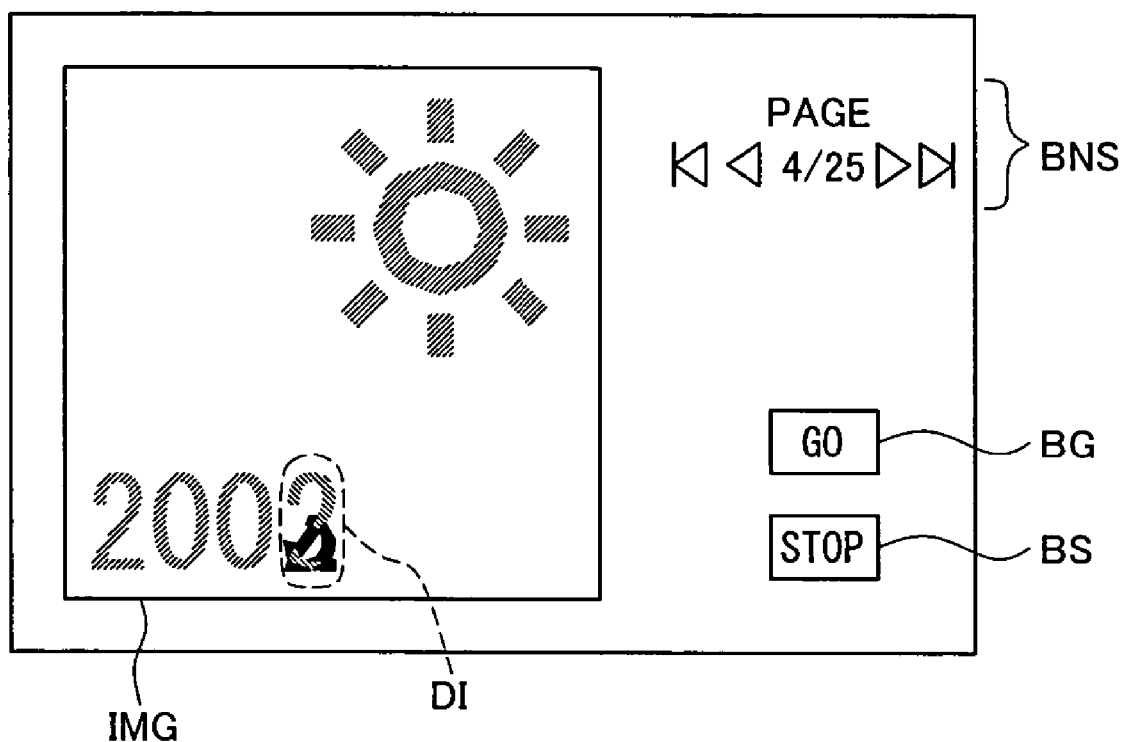
FIG. 20 is a schematic diagram illustrating a plate image inspection processing results screen.

FIG. 20 is a schematic diagram illustrating an inspection results screen displayed on the display device 400 (FIG. 1). On the screen shown in FIG. 20, there are displayed an inspection results image IMG represented by plate image inspection results data; a button BG for causing processing to proceed ahead; a button BS for canceling processing; and a page number display BNS showing the page number of the image represented by the inspection results image IMG. In this inspection results image IMG, pixels whose pixel value difference is greater than a predetermined threshold value are displayed in dark color (for example, with 100% magenta), and pixels whose pixel value difference is less than the threshold value are displayed in light color. In the example of FIG. 20, the numeral "2" in area D1 is changed to "3" by unknown reasons. Thus, in the image IMG shown in FIG. 20, the pixels which have a large pixel value difference are displayed in a dark color in the area D1 where this change has occurred, and the other pixels which have a small or no pixel value difference are displayed in a light color. In this manner, if the pixels whose pixel value difference is equal to or greater than a threshold value, that is, the area where there was a change, the changed area is displayed such that it stands out and a user can easily confirm the area where the change occurred. The threshold value can be set, for example, at 30 when the entire range of the pixel value is between 0 and 255. By setting the threshold value larger, only the pixels which have great pixel value difference can be made to stand out. In other words, only large mismatches will be detected by the plate image inspection when the threshold value is set at a large value.

Since a user is notified of the fact that there is a plate image mismatch via the alert display screen (FIG. 19) like this, he can suitably give instructions as to whether or not processing is to proceed thereafter. Further, since the area where there is a change is displayed so as to stand out in the comparison results preview screen shown in FIG. 20, a determination as to whether or not this image data (the final output data in the example explained hereinabove) is appropriate can be readily made. When a user determines that the image data is appropriate, he can cause processing to proceed ahead by operating button BG. Further, when an inappropriate change occurs, he can cancel processing by stop button BS. The change area may be displayed in another manner such as blinking or being boxed off. Further, the changed area may also be enlarged and displayed, or displayed using a specific color.

As explained hereinabove, in the fourth embodiment, since an inter-step plate image inspection can be carried out using page layout conditions, an appropriate inspection can be performed even between steps for which the page layout conditions differ. Further, by carrying out inspection using confirmed mount layout image data, it is possible to prevent the continuation of processing using image data that is inappropriate for printing prepress.

When mount layout image data is not black-and-white data, but rather color data comprising a plurality of color components (RGB, or YMCK and so forth), it is preferable that the inspection executing section 360c carry out comparison for each color component. By so doing, plate image inspection can be appropriately carried out for each color component. In this case, in a plate image inspection results image, the plate image inspection processing results for each color component can be compiled into a single image, and pixels, for which the pixel value difference of any of the color components is a threshold value or higher, can be displayed so as to stand out. Alternatively, plate image inspection processing results for each color component can be displayed individually. Further, prescribed threshold values can be set such that the values differ according to the color component.

It is preferable that the various conditions for plate image inspection processing be set beforehand in a job ticket JT (FIG. 2). For example, items such as those below can be set as plate image inspection processing conditions.

(1) Two images used for comparison: For example, an image at halftone proof, and an image at final output.

(2) Degree of ambiguity of comparison in plate image inspection processing: Any one of "None," "Slight," or "Great."

(3) Action Mode When Plate Image Mismatch Occurs: Any one of "Stop Processing," "Display Alert," or "Record Processing History."

"None" for the degree of ambiguity of comparison denotes a mode, wherein, when two image data do not completely coincide with each other, they are judged to be inconsistent and have a plate image mismatch. "Slight" denotes a mode, wherein, when a difference is detected between two images, a check is made to determine whether or not there is pixel data that coincides within a fixed range therearound, and when coinciding pixel data exists, a determination is made that there is no plate image mismatch. "Great" denotes a mode, wherein, when a difference is detected between two images, and when either coinciding pixel data exists within a fixed range therearound, or when the difference is less than a predetermined value, a determination is made that there is no plate image mismatch.

As for the action modes when a plate image mismatch occurs, when "Stop Processing" is set, for example, processing is stopped immediately without displaying FIG. 19 described hereinabove. When "Display Alert" is set, FIG. 19 is displayed, and thereafter, a determination to either continue or stop processing is made in accordance with user instructions. Further, when "Record Processing History" is set, the fact that an image mismatch occurred is recorded in the processing log, and thereafter, processing continues on without stopping. It is preferable that a job ticket be constituted such that one of a plurality of such action modes can be selected as the action mode when a plate image mismatch occurs.

Setting various conditions for plate image inspection processing in a job ticket JT beforehand, and executing inspection in accordance with these conditions like this makes it possible to execute appropriate inspection according to the requirements for each job.

Furthermore, in the fourth embodiment described hereinabove, an explanation is given concerning the third plate image inspection process of FIG. 13 as an inter-step plate image inspection using printing page layout conditions, but the same processing can be executed for the first plate image inspection process or the second plate image inspection process.

As explained above, in the fourth embodiment, since an inter-step plate image inspection can be carried out using page layout conditions, appropriate plate image inspection can also be carried out between steps using different page layout conditions.

F. Fifth Embodiment

Figure 21:
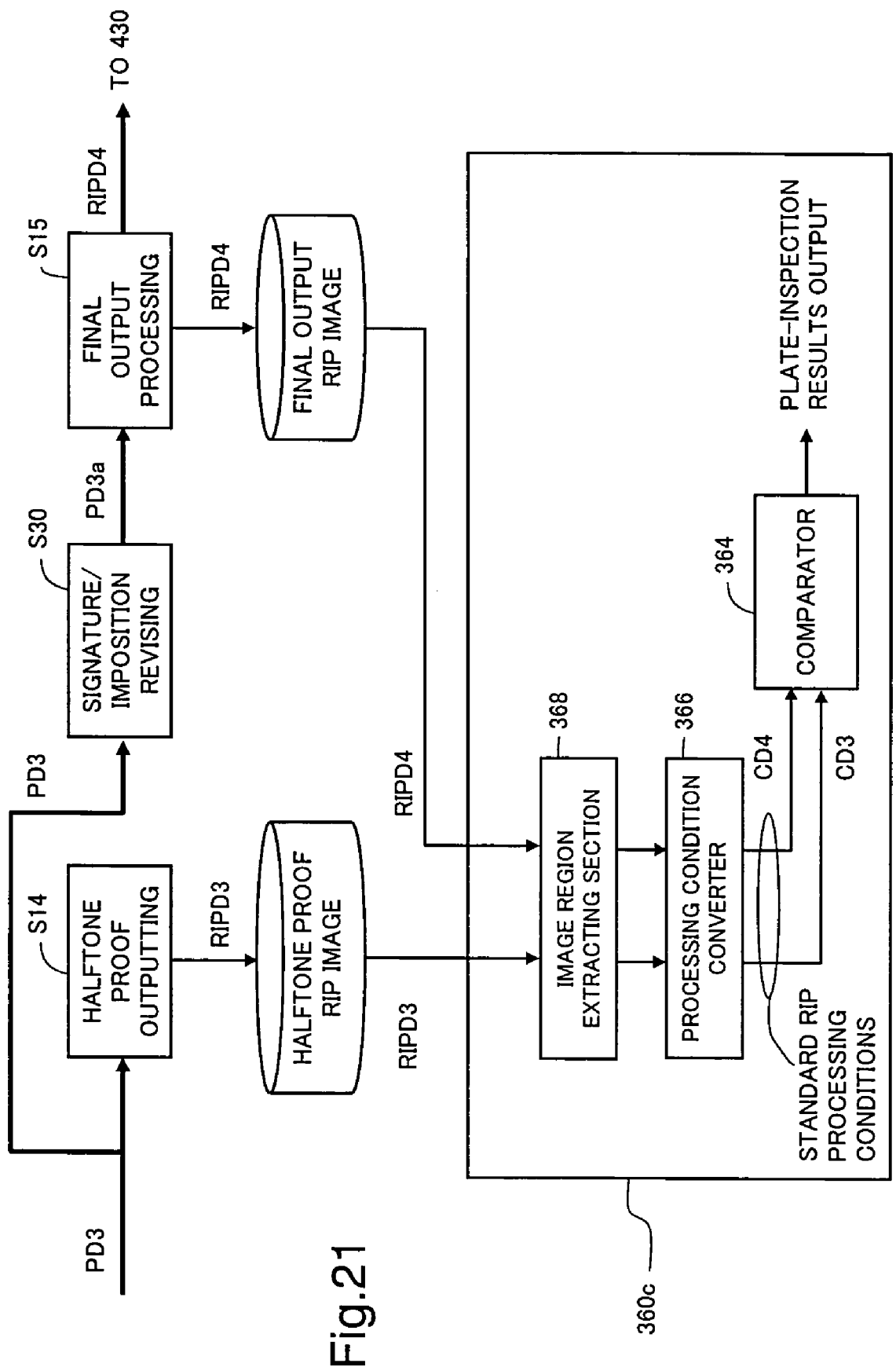
FIG. 21 shows a plate image inspection process of a fifth embodiment.

FIG. 21 shows a plate image inspection process of a fifth embodiment. This process adds a signature/imposition revising step S30 between the halftone proof outputting step S14 and the final output processing step S15 of the fourth embodiment shown in FIG. 12, but the other steps are the same as those of the fourth embodiment. However, in FIG. 21, the schematic of the steps further upstream from Step S14 have been omitted from the figure.

Figure 22:
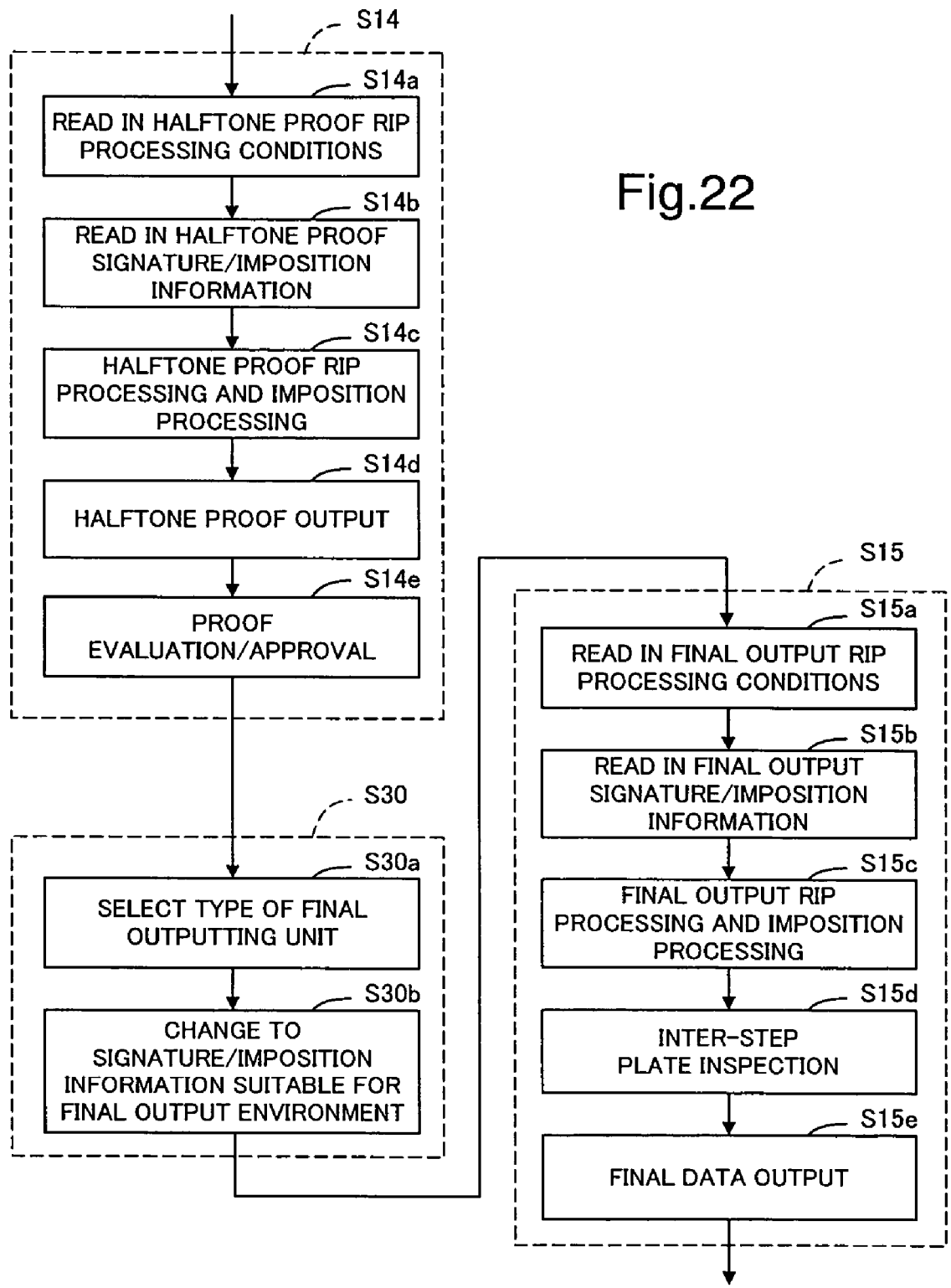
FIG. 22 is a flowchart showing the detailed procedures of Steps S14, S30, S15 in the fifth embodiment.

FIG. 22 is a flowchart showing the detailed procedures of Steps S14, S30, S15 in the fifth embodiment. In the halftone proof outputting step S14, first, halftone proof RIP processing conditions are read in from a job ticket JT (FIG. 2) in Step S14a, and halftone proof signature/imposition information is read in from the job ticket JT in Step S14b. In Step S14c, halftone proof RIP processing and signature/imposition processing are executed in accordance with this information. As a result of this, a RIP image, for which image layout has been carried out in the state shown in the FIG. 16, is obtained. In Step S14d, this RIP image is outputted as a halftone proof. In Step S14e, this halftone proof is checked and approved by the customer and/or the worker. When a defect is discovered and the halftone proof is not approved at this point, for example, processing returns to the job production process prior to the prepress process, and the job is revised.

Thus, when the halftone proof is approved, the prepress process worker selects the type of final outputting unit in Step S30a of the signature/imposition revising step S30. In Step S30b, the signature/imposition information is changed as needed such that the signature/imposition state is suitable for the type of final outputting unit selected. For example, when an outputting unit capable of outputting a larger plate than the initially intended outputting unit is selected, a change is made so as to increase the number of impositions. Subsequent to the change, the signature/imposition information is reflected in a job ticket JT.

In the final output processing step S15, first, the final output RIP processing conditions are read in from the job ticket JT in Step S15a, and final output signature/imposition information is read in from the job ticket JT in Step S15b. In Step S15c, final output RIP processing and signature/imposition processing are executed in accordance with this information. As a result, a RIP image, for which image layout has been carried out in the state shown in the FIG. 17, is obtained. In Step S15d, the plate image inspection described in the fourth embodiment is executed on the basis of final output RIP image data RIPD4 and halftone proof RIP image data RIPD3. The plate image inspection processing explained in the first through the third embodiments can be executed instead of this. Then, when the plate image inspection results are good, the final output data is transferred to the outputting unit, and actual output (for example, the fabrication of a plate) is executed in Step S15e.

Figure 23A:
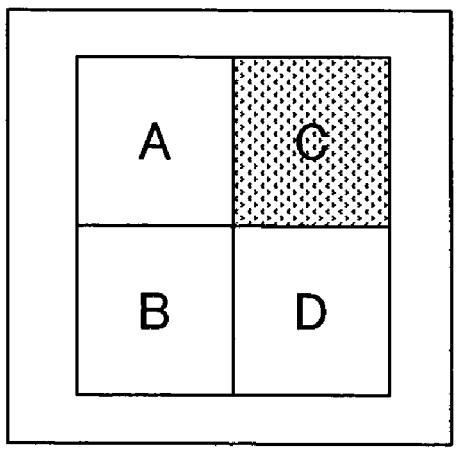
FIGS. 23(A) and 23(B) show an example of an error related to a signature.
Figure 23B:
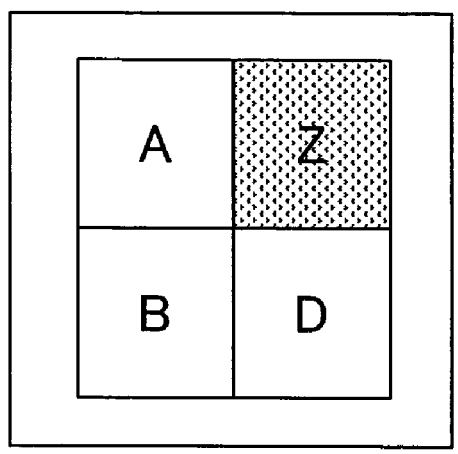

Thus, in the fifth embodiment, a signature/imposition step S30 exists between the halftone proof outputting step S14 and the final outputting step S15. When the signature or imposition is changed at this time, an error of some sort can occur. FIGS. 23(A) and 23(B) show an example of an error related to a signature. FIG. 23(A) shows a layout before signature change, and four pages of images A, B, C, D are arranged on a single mount area. FIG. 23(B) shows the layout after signature change. The situation shown here is one in which page C of before the change (indicated by hatching) was supposed to be replaced with page E not shown in the figure, but in actuality, page Z was laid out by mistake.

Figure 24A:
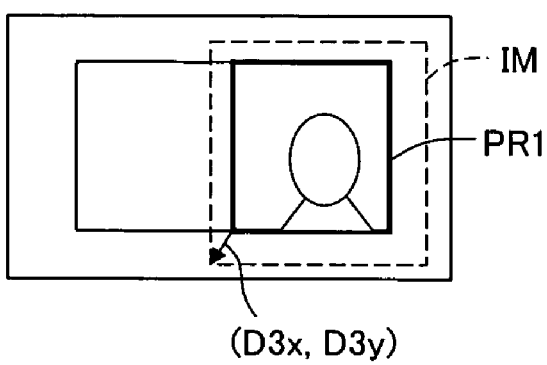
FIGS. 24(A) and 24(B) show an example of an error related to the layout of an image object.
Figure 24B:
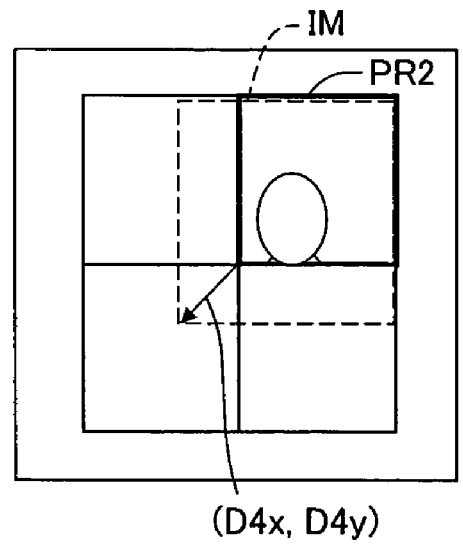

FIGS. 24(A) and 24(B) show an example of an mismatch related to the layout of an image object. FIG. 24(A) shows a state, wherein an image object IM is allocated to the effective area PR1 (indicated by a solid bold line) of the right page in the halftone proof layout. The size of the image (indicated by a dashed line) of the image object IM is larger than the effective area PR1, and only the image part within this effective area PR1 will be rendered as printed matter. The position coordinates (D$3x$, D$3y$) of the origin (lower left point) of the image object IM is set using coordinates that are offset from the origin (lower left point) of the effective area PR1. FIG. 24(B) shows a state, wherein the same image object IM is allocated to effective area PR2 of the upper right page in a final output layout. Here, the position coordinates (D$4x$, D$4y$) of the origin of the image object IM have been mistakenly changed, and as a result of this, an error has occurred in the image part to be rendered within the effective area PR2.

In the fifth embodiment, since an inspection of printing images prepared respectively in two steps is executed in Step S15d (FIG. 22) even when errors such as those of FIGS. 23(A)-23(B) and 24(A)-24(B) above have occurred, it is possible to detect these errors. It is particularly advantageous in that, since this inter-step plate image inspection is carried out prior to transferring final output data to an outputting unit, it is possible to prevent the production of a plate or printed matter using erroneous data.

G. Sixth Embodiment

Figure 25:
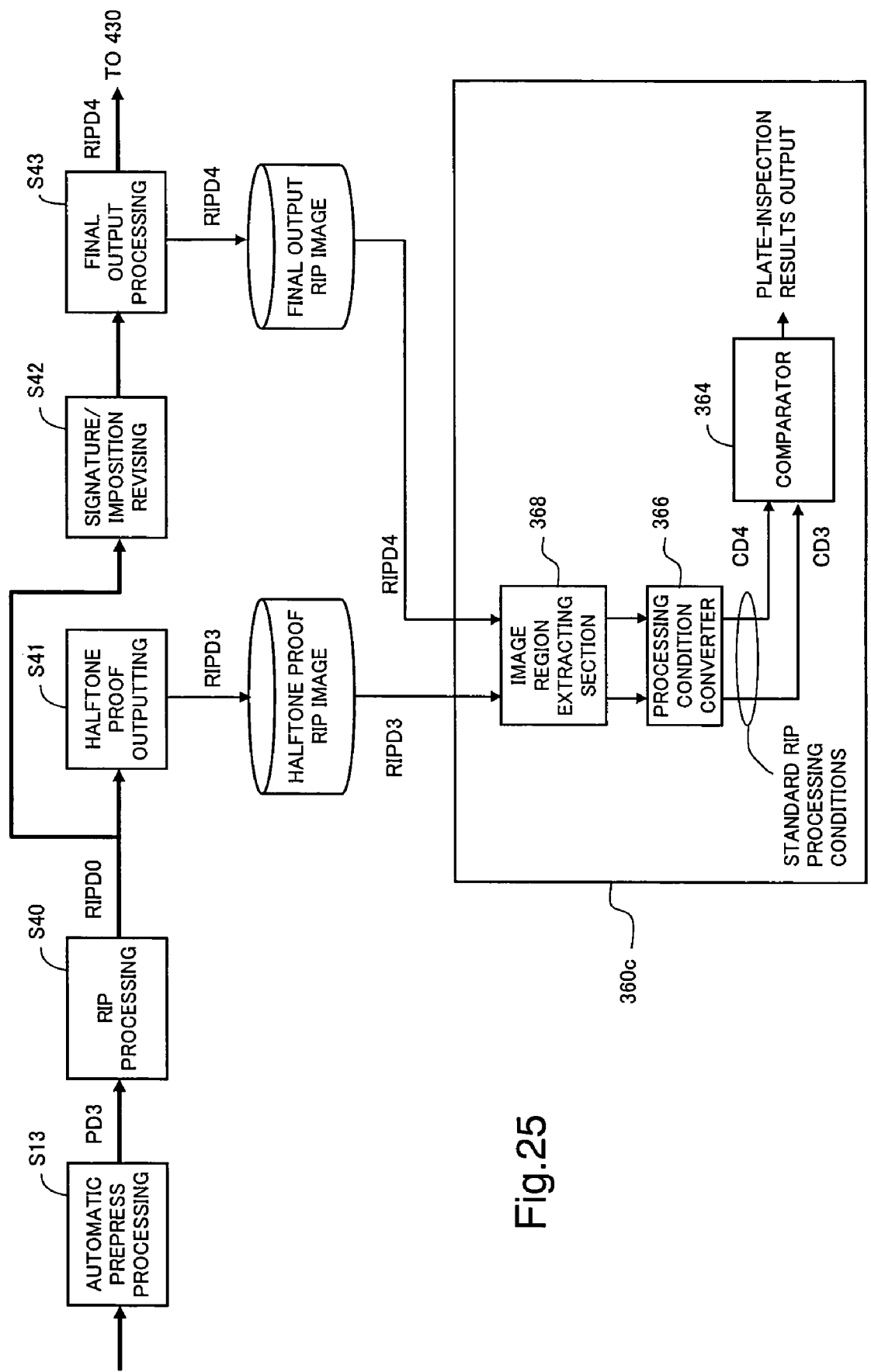
FIG. 25 shows a plate image inspection process of a sixth embodiment.

FIG. 25 shows a plate image inspection process of a sixth embodiment. This process replaces the halftone proof outputting step S14 and final output processing step S15 of the fourth embodiment shown in FIG. 12 with four Steps S40, S41, S42, S43, and the automatic prepress processing step S13 and the steps previous thereto are the same as those of the fourth embodiment. Furthermore, whereas RIP processing is carried out in the halftone proof outputting step S14 and final output processing step S15, respectively, in the process of FIG. 12, RIP processing is only carried out one time in Step S40 in the process of FIG. 25, and is not carried out in the halftone proof outputting step S41 and final output processing step S43. Due to this fact, the process of FIG. 25 can be called a "RIP once process." Furthermore, in FIG. 25, the schematic of the steps further upstream from automatic prepress processing step S13 have been omitted from the figure.

Figure 26:
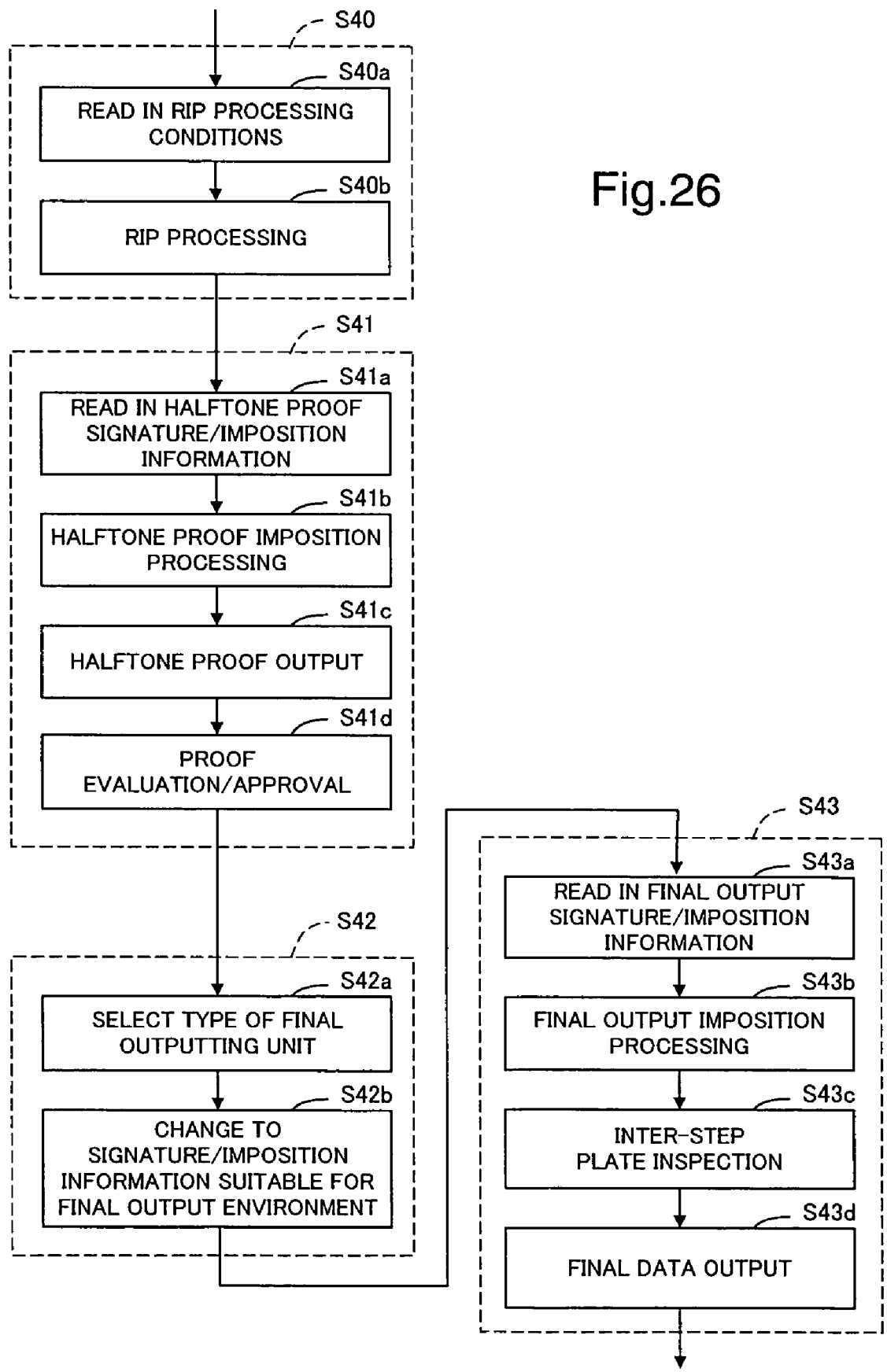
FIG. 26 is a flowchart showing the detailed procedures of Steps S40 through S43 in the sixth embodiment.

FIG. 26 is a flowchart showing the detailed procedures of Steps S40 through S43 in the sixth embodiment. In the RIP processing step S40, first, RIP processing conditions are read in from a job ticket JT in Step S40a, and RIP processing is executed in accordance with these conditions in Step S40b. Conditions suitable for final output are used as these RIP processing conditions. RIP data RIPD0 (FIG. 25) prepared in this manner is used when a printing image is outputted in subsequent Steps S41, S43.

Steps S41a through S41d of the halftone proof step S41 are the same as Step S14 shown in FIG. 22 except that there is no steps of reading RIP processing conditions and RIP processing. Furthermore, when the output resolution for the halftone proof is lower than the output resolution for final output, resolution reduction processing for thinning out RIP image data is executed.

Steps S42a, S42b of the signature/imposition revising step S42 of FIG. 25 are the same as Step S30 shown in FIG. 22. Steps S43a through S43d of final outputting step 43 are the same as Steps S15 shown in FIG. 22, except that there is no steps of reading RIP processing conditions and RIP processing.

As explained hereinabove, since plate image inspection of printing images respectively prepared in different steps is executed even in a RIP once process like the sixth embodiment, it is possible to detect errors that occurred between these steps.

H. Modified Example

In each of the embodiments described hereinabove, the RIP processing conditions were defined by the five condition parameters of resolution, number of tone levels, color system, tone reproduction and compression method, but the present invention can be constituted such that RIP processing conditions are defined by a plurality of arbitrary condition parameters other than these.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of inspecting a print image that is sequentially being processed in a printing prepress system by a plurality of sequential prepress processing steps, comprising:
    (a) preparing, carried out by a processor, a first RIP data by executing RIP processing on a first print image data according to first RIP processing conditions, the first RIP processing conditions including a resolution, a number of tone levels, a color system, a tone reproduction, and a compression method for the first RIP data;
    (b) preparing, carried out by the processor, a second RIP data by executing RIP processing, in accordance with second RIP processing conditions that differ from the first RIP processing conditions, on a second print image data obtained by carrying out another prepress processing to the first print image data, the another prepress processing step being one of the sequential prepress processing steps excluding correction after client's proofreading, the second RIP processing conditions including a resolution, a number of tone levels, a color system, a tone reproduction, and a compression method for the second RIP data;
    (c) preparing, carried out by the processor, a first plate-image-inspection RIP data in accordance with standard RIP processing conditions by converting the first RIP data, using a first profile representing relationship between the standard RIP processing conditions and the first RIP processing conditions;
    (d) preparing, carried out by the processor, a second plate-image-inspection RIP data in accordance with the standard RIP processing conditions by converting the second RIP data, using a second profile representing relationship between the standard RIP processing conditions and the second RIP processing conditions; and
    (e) comparing, carried out by the processor, the first and second plate-image-inspection RIP data to detect differences between the first and second print image data.

2. A method according to claim 1, wherein the standard RIP processing conditions include, as a parameter, a resolution lower than a resolution in a final plate image outputting step.

3. A method according to claim 1, wherein each of the first and second print image data represent an image in which at least one print page is laid out on a mount area in accordance with specified page layout conditions, and
each of the steps (c) and (d) comprises:
extracting an image region corresponding to a same print page from each print image data, based on the page layout conditions specified for each print image data.

4. A method according to claim 3, wherein the step of extracting the image region comprises rotating the image region of at least one of the first and second print image data so that layout angles of the same print page for the first and second print image data become equal to each other.

5. A prepress system capable of executing a plate image inspection for inspecting a print image that is sequentially being processed by a plurality of sequential prepress processing steps, the prepress system comprising:
    a first RIP processor for preparing a first RIP data by executing RIP processing on a first print image data according to first RIP processing conditions;
    a second RIP processor for preparing a second RIP data by executing RIP processing, in accordance with second RIP processing conditions that differ from the first RIP processing conditions, on a second print image data obtained by carrying out another prepress processing to the first print image data, the another prepress processing step being one of the sequential prepress processing steps excluding correction after client's proofreading;
    a converter for preparing a first plate-image-inspection RIP data in accordance with standard RIP processing conditions by converting the first RIP data, using a first profile representing relationship between the standard RIP processing conditions and the first RIP processing conditions, and for preparing a second plate-image-inspection RIP data in accordance with the standard RIP processing conditions by converting the second RIP data, using a second profile representing relationship between the standard RIP processing conditions and the second RIP processing conditions; and a comparator for comparing the first and second plate-image-inspection RIP data to detect differences between the first and second print image data.

6. A prepress system according to claim 5, wherein the standard RIP processing conditions include, as a parameter, a resolution lower than a resolution in a final plate image outputting step.

7. A prepress system according to claim 5, wherein each of the first and second print image data represent an image in which at least one print page is laid out on a mount area in accordance with specified page layout conditions, and the prepress system further comprises:

an image region extracting section for extracting an image region corresponding to a same print page from each print image data, based on the page layout conditions specified for each print image data.

8. A prepress system according to claim 7, wherein the image region extracting section is configured to rotate the image region of at least one of the first and second print image data so that layout angles of the same print page for the first and second print image data become equal to each other.

* * * * *